United States Patent
Choudhury et al.

(10) Patent No.: US 8,315,221 B2
(45) Date of Patent: Nov. 20, 2012

(54) REDUCING FEEDBACK OVERHEAD FOR MULTIPLE COMPONENT CARRIERS

(75) Inventors: Sayantan Choudhury, Vancouver, WA (US); Zhanping Yin, Vancouver, WA (US); Shohei Yamada, Camas, WA (US)

(73) Assignee: Sharp Laboratories of America, Inc., Camas, WA (US)

(*) Notice: Subject to any disclaimer, the term of this patent is extended or adjusted under 35 U.S.C. 154(b) by 196 days.

(21) Appl. No.: 12/819,171

(22) Filed: Jun. 18, 2010

(65) Prior Publication Data
US 2011/0312332 A1 Dec. 22, 2011

(51) Int. Cl.
*H04W 4/00* (2009.01)
(52) U.S. Cl. ........ 370/329; 370/330; 370/437; 455/450; 455/452.2
(58) Field of Classification Search .......... 455/450, 455/452.2, 509, 513, 515; 370/344, 436, 370/464, 477–480
See application file for complete search history.

(56) References Cited

U.S. PATENT DOCUMENTS

| | | | |
|---|---|---|---|
| 7,551,898 B2 | 6/2009 | Gaal et al. | |
| 7,649,960 B2 | 1/2010 | Raghavan et al. | |
| 7,656,843 B2 | 2/2010 | Puig-Oses et al. | |
| 7,920,511 B2* | 4/2011 | Khan et al. | 370/328 |
| 8,073,069 B2* | 12/2011 | Mundarath et al. | 375/267 |
| 2007/0026813 A1* | 2/2007 | Khan | 455/69 |
| 2008/0153506 A1* | 6/2008 | Yin et al. | 455/452.2 |
| 2009/0316809 A1* | 12/2009 | Chun et al. | 375/260 |
| 2010/0034093 A1* | 2/2010 | Roh | 370/241 |
| 2010/0054114 A1* | 3/2010 | Li et al. | 370/203 |
| 2010/0091892 A1 | 4/2010 | Gorokhov | |
| 2010/0091893 A1 | 4/2010 | Gorokhov | |
| 2010/0246512 A1 | 9/2010 | Kawamura et al. | |
| 2011/0064153 A1* | 3/2011 | Khan | 375/260 |
| 2011/0159866 A1* | 6/2011 | Kim et al. | 455/422.1 |
| 2011/0237282 A1* | 9/2011 | Geirhofer et al. | 455/509 |
| 2011/0243066 A1* | 10/2011 | Nayeb Nazar et al. | 370/328 |
| 2011/0244847 A1* | 10/2011 | Mallik et al. | 455/422.1 |
| 2011/0317614 A1* | 12/2011 | Park et al. | 370/315 |

FOREIGN PATENT DOCUMENTS

| | | |
|---|---|---|
| EP | 2 330 845 | 6/2011 |
| JP | 2009-89187 | 4/2009 |
| WO | 2009/082110 | 7/2009 |
| WO | 2010/032811 | 3/2010 |

OTHER PUBLICATIONS

International Search Report issued for International Patent Application No. PCT/JP2011/064335 on Sep. 20, 2011.
3GPP TS 36.213 V8.6.0, "Evolved Universal Terrestrial Radio Access (E-UTRA); Physical layer procedures (Release 8)," Mar. 2009.

(Continued)

*Primary Examiner* — Jinsong Hu
*Assistant Examiner* — Magdi Elhag
(74) *Attorney, Agent, or Firm* — Austin Rapp & Hardman

(57) ABSTRACT

A wireless communication device configured for reducing feedback overhead for multiple component carriers is described. The wireless communication device includes a processor and instructions stored in memory. The wireless communication device receives signals on a plurality of component carriers and determines at least one feedback value based on the signals. The wireless communication device also generates at least one reduced overhead feedback message for the plurality of component carriers based on the at least one feedback value and sends the at least one reduced overhead feedback message.

26 Claims, 13 Drawing Sheets

OTHER PUBLICATIONS

Qualcomm Incorporated, "CQI for CA," R1-102322, Apr. 2010.
Catt "CQI Feedback for LTE-A," R1-100878, Feb. 2010.
Qualcomm Incorporated, "CQI Feedback for Multicarrier Operation," R1-101478, Feb. 2010.

* cited by examiner

US 8,315,221 B2

REDUCING FEEDBACK OVERHEAD FOR MULTIPLE COMPONENT CARRIERS

TECHNICAL FIELD

The present disclosure relates generally to communication systems. More specifically, the present disclosure relates to reducing feedback overhead for multiple component carriers.

BACKGROUND

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of cells, each of which may be serviced by a base station. A base station may be a fixed station that communicates with wireless communication devices.

As wireless communication devices have advanced, improvements in communication speed have been sought. For example, many wireless communication devices now support more than a traditional voice service. More specifically, wireless communication devices are often being used for data services, such as accessing the Internet and browsing the Web. These data services may demand fast communication speeds to offer a satisfactory experience.

One way to improve the communication speed of a wireless communication device is to allocate more communication resources to the wireless communication device. However, when more resources are allocated, more feedback may be used for device operation. Using more feedback may consume more resources, which may be limited. As can be seen from this discussion, systems and methods that improve the efficiency of feedback for device operation may be beneficial.

DETAILED DESCRIPTION

Figure 1:
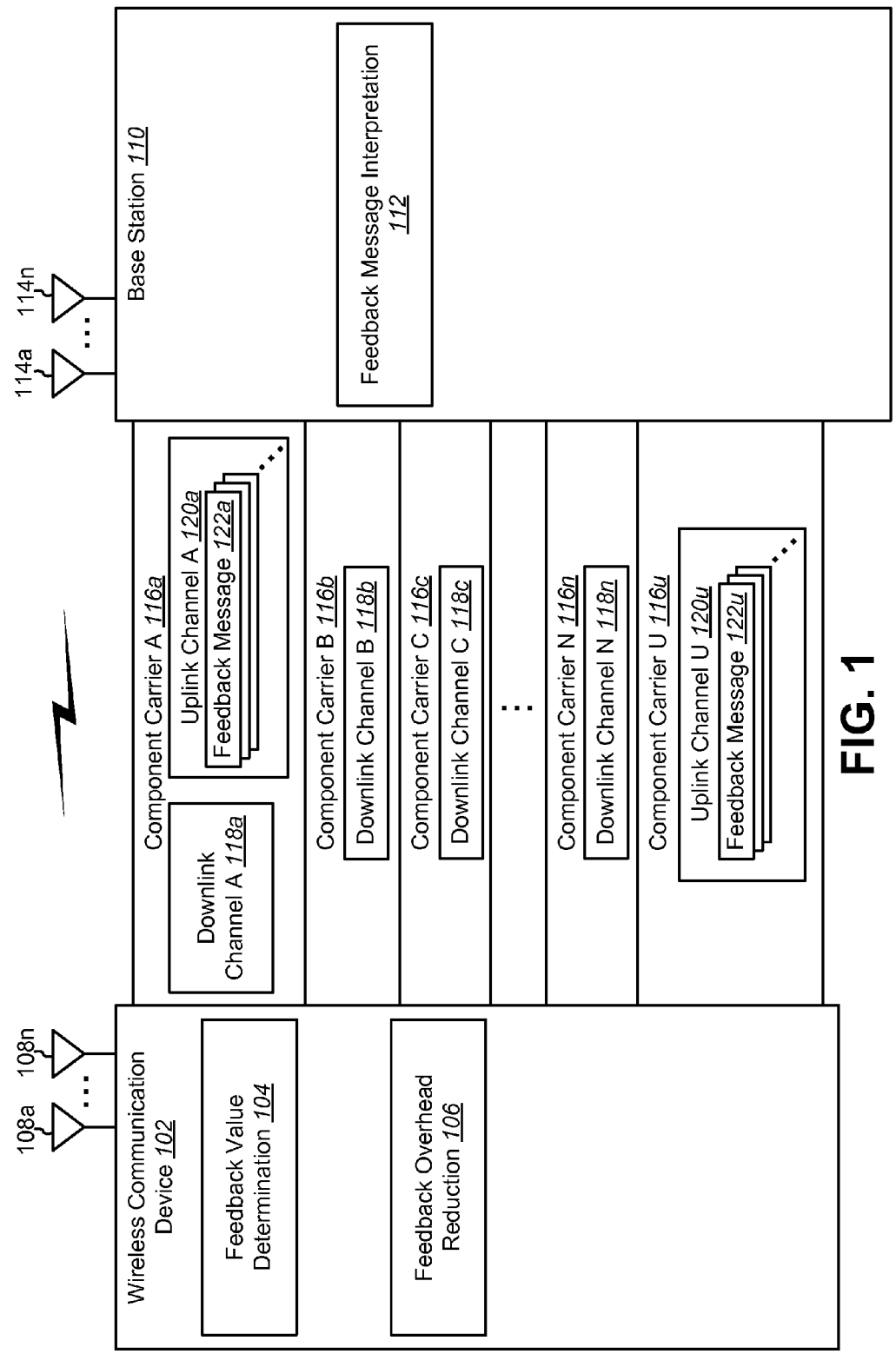
FIG. 1 is a block diagram illustrating one configuration of a wireless communication device and a base station in which systems and methods for reducing feedback overhead for multiple component carriers may be implemented.

The 3rd Generation Partnership Project, also referred to as "3GPP," is a collaboration agreement that aims to define globally applicable technical specifications and technical reports for third and fourth generation wireless communication systems. The 3GPP may define specifications for the next generation mobile networks, systems and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE and LTE-Advanced standards (e.g., Release-8 and Release-10). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a user equipment (UE), an access terminal, a subscriber station, a mobile terminal, a remote station, a user terminal, a terminal, a subscriber unit, a mobile device, etc. A wireless communication device may be a cellular phone, a smart phone, a personal digital assistant (PDA), a laptop computer, a netbook, an e-reader, a wireless modem, etc. In 3GPP specifications, a wireless communication device is typically referred to as a user equipment (UE). However, as the scope of the present disclosure should not be limited to the 3GPP standards, the terms "UE" and "wireless communication device" may be used interchangeably herein to mean the more general term "wireless communication device."

In 3GPP specifications, a base station is typically referred to as a Node B, an evolved Node B (eNB), a home enhanced or evolved Node B (HeNB) or some other similar terminology. As the scope of the disclosure should not be limited to 3GPP standards, the terms "base station," "Node B," "eNB" and "HeNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote both a wireless communication device and/or a base station.

In Release-10 of the 3GPP standard (e.g., LTE-Advanced) for cellular wireless communication, several channels known as component carriers may be provisioned for transmission of information for both the uplink (e.g., signals from a wireless communication device to a base station) and downlink (e.g., signals from a base station to a wireless communication device). In addition, a number of spatial channels may be available on each component carrier by using multiple antennas at a transmitter and a receiver. Therefore, multiple code words may be transmitted simultaneously.

A receiver may inform the transmitter regarding the successful or unsuccessful reception of data. This is typically accomplished by transmitting an Acknowledgement/Negative Acknowledgement (ACK/NACK) message. If the data is received successfully (e.g., correctly), an Acknowledgement (ACK) message is transmitted. Otherwise, a Negative Acknowledgement (NACK) message is transmitted.

A wireless communication device may be configured for sending feedback messages to a base station. For example, the wireless communication device may send Channel Quality Indicators or Information (CQI), Precoding Matrix Indicators (PMI) and/or Rank Indicators (RI). CQI relates to a channel quality indicator. PMI refers to an index that maps to a set of precoding matrices that may be used for multiple antenna transmission precoding (i.e., to shape the beams). RI indicates the rank of a Multiple Input Multiple Output (MIMO) matrix channel (e.g., whether it is rank 1, 2, etc.). A wireless communication device (e.g., UE) may determine a RI corresponding to the number of useful transmission layers. In 3GPP LTE (Long Term Evolution) Release 8, the channel quality indicator (CQI) is reported by a UE to the eNodeB in order to assist the eNodeB in selecting an appropriate modulation and coding scheme for downlink data transmission. With the introduction of component carriers (CC) in Release 10, the amount of CQI that needs to be reported can increase significantly since the CQI information for each of the component carriers needs to be reported. The systems and methods disclosed herein describe multiple ways for reducing the periodic feedback (e.g., CQI) overhead for multiple component carrier deployment scenarios.

A UE may transmit periodic CQI/PMI and/or RI reporting on a PUCCH in subframes with no PUSCH allocation. A UE may transmit periodic CQI/PMI or RI reporting on a PUSCH in subframes with a PUSCH allocation, where the UE may use the PUCCH-based periodic CQI/PMI or RI reporting format on the PUSCH.

The periodic reporting of CQI, PMI and RI is carried out using a Physical Uplink Control Channel (PUCCH) in LTE and includes wideband CQI and UE selected subband CQI. The period of reporting may be semi-statically configured by higher layers. In Release-10, there may be the introduction of multiple component carriers (compared to a single component carrier in Release-8). With the introduction of multiple component carriers, there may be an increased overhead for feedback reporting in LTE Advanced compared to Release-8. For instance, a straightforward scheme would be to reuse Release-8 feedback reporting for a single component carrier and extend it to multiple component carriers. Hence, if the feedback overhead for Release-8 was M bits, the overhead for N component carriers would be M×N bits. Moreover, in Release-10, even for multiple component carriers, the uplink PUCCH may be transmitted on a single component carrier which is semi-statically assigned.

The systems and methods disclosed herein describe various solutions to reduce the feedback overhead (in terms of number of bits) for multiple component carrier reporting. While some examples are given for wideband CQI, the systems and methods herein are also applicable to UE reported CQI. Wideband CQI and UE reported CQI are two different transmission modes for periodic CQI transmission over the PUCCH. "Wideband" may denote a set S of subbands which may comprise the entire system bandwidth. The set of subbands (S) that a UE may evaluate for CQI reporting may span the entire downlink system bandwidth. A subband may be a set of k contiguous Physical Resource Blocks (PRBs), where k is a function of system bandwidth. On the other hand, UE reported CQI may be CQI which is reported on the particular band being used by the UE.

A wireless communication device configured for reducing feedback overhead for multiple component carriers is disclosed. The wireless communication device includes a processor and instructions stored in memory. The wireless communication device receives signals on a plurality of component carriers and determines at least one feedback value based on the signals. The wireless communication device also generates at least one reduced overhead feedback message for the plurality of component carriers based on the at least one feedback value and sends the at least one reduced overhead feedback message.

The at least one reduced overhead feedback message may be generated based on a difference between a first feedback value and a second feedback value. The first feedback value may correspond to a reference component carrier. The reference component carrier may be one of a group consisting of an anchor component carrier, a primary component carrier and a component carrier corresponding to a best feedback value. The first feedback value may correspond to a secondary component carrier and the second feedback value corresponds to an additional component carrier.

The at least one reduced overhead feedback message may be mapped to a resource to implicitly indicate a component carrier corresponding to the reduced overhead feedback message. The at least one reduced overhead feedback message may include a different number of bits than another reduced overhead feedback message corresponding to another component carrier.

The at least one reduced overhead feedback message may include a number of bits, where more bit combinations are used to represent better feedback values than are used to represent lower feedback values. The at least one reduced overhead feedback message may represent a feedback value for a group of component carriers that are grouped in downlink control channel signaling. The at least one reduced overhead feedback message may be sent for a plurality of selected component carriers. The plurality of selected component carriers may be correlated according to one of the group consisting of time, frequency and space.

The wireless communication device may further order a plurality feedback values and select a number of best feedback values. The wireless communication device may also further generate a number of reduced overhead feedback messages based on the best feedback values and send only the number of reduced overhead feedback messages based on the best feedback values.

The at least one reduced overhead feedback message may be sent with greater than a minimum periodicity. The at least one reduced overhead feedback message may include two reduced overhead feedback messages comprising a first matrix and a second matrix used to determine a precoding matrix, where the first matrix and the second matrix are sent with different periodicities.

The at least one feedback value may be a Channel Quality Indicator (CQI), a Precoding Matrix Indicator (PMI) or a Rank Indicator (RI). The wireless communication device may also send the reduced overhead feedback message on a single uplink channel, where the reduced overhead feedback message is based on a combination of multiple feedback values.

Another wireless communication device configured for reducing feedback overhead for multiple component carriers is disclosed. The wireless communication device includes a processor and instruction stored in memory. The wireless communication device receives signals on a plurality of component carriers and determines at least one feedback value based on the signals. The wireless communication device also generates at least one reduced overhead feedback message based on the at least one feedback value and determines whether the at least one reduced overhead feedback message collides with an Acknowledgement/Negative Acknowledgement (ACK/NACK) message. The wireless communication device does not send the at least one reduced overhead feedback message if the at least one reduced overhead feedback message collides with the ACK/NACK message and sends only the ACK/NACK message using a format that is typically used to send a feedback message and an ACK/NACK message.

A method for reducing feedback overhead for multiple component carriers is also disclosed. The method includes receiving signals on a plurality of component carriers and determining, on a wireless communication device, at least one feedback value based on the signals. The method also includes generating at least one reduced overhead feedback message for the plurality of component carriers based on the at least one feedback value and sending the at least one reduced overhead feedback message.

Another method configured for reducing feedback overhead for multiple component carriers is disclosed. The method includes receiving signals on a plurality of component carriers and determining at least one feedback value based on the signals. The method also includes generating, on a wireless communication device, at least one reduced overhead feedback message based on the at least one feedback value and determining whether the at least one reduced overhead feedback message collides with an Acknowledgement/Negative Acknowledgement (ACK/NACK) message. The method also includes not sending the at least one reduced overhead feedback message if the at least one reduced overhead feedback message collides with the ACK/NACK message and sending, from the wireless communication device, only the ACK/NACK message using a format that is typically used to send a feedback message and an ACK/NACK message.

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods. As used herein, the term "plurality" may indicate two or more. For example, a plurality of components refers to two or more components.

FIG. 1 is a block diagram illustrating one configuration of a wireless communication device 102 and a base station 110 in which systems and methods for reducing feedback overhead for multiple component carriers may be implemented. The wireless communication device 102 communicates with the base station 110 using one or more antennas 108a-n. For example, the wireless communication device 102 transmits electromagnetic signals to the base station 110 and receives electromagnetic signals from the base station 110 using the one or more antennas 108a-n. The base station 110 communicates with the wireless communication device 102 using one or more antennas 114a-n.

The wireless communication device 102 and the base station 110 may use multiple component carriers 116a-n, 116u to communicate with each other. A component carrier 116 may be an allocation of communication resources or channel used for conveying communication signals. For example, each component carrier 116 may be a communication band with a 20 megahertz (MHz) bandwidth in frequency. Furthermore, multiple antennas 108a-n, 114a-n may be used to make multiple spatial channels available on each component carrier 116.

Each component carrier 116 may be used to carry one or more downlink channels 118a-n and/or one or more uplink channels 120a, 120u. For example, both downlink channel A 118a and uplink channel A 120a may be provided on component carrier A 116a. Alternatively or in addition, a single downlink channel 118 or uplink channel 120 may be provided on each component carrier 116. For example, component carrier B 116b through component carrier N 116n may each carry only one corresponding downlink channel 118b-n. Furthermore, component carrier U 116u may carry only uplink channel U 120u. Additionally or alternatively, a downlink channel 118 may use multiple component carriers 116 and/or an uplink channel 120 may use multiple component carriers 116. Whether a component carrier 116 may carry both uplink and downlink transmissions (or only one) may depend on whether Time Division Duplex (TDD) or Frequency Division Duplex (FDD) is used, for example.

In one configuration, for example, there may be multiple physical channels in both downlink and uplink on one component carrier 116 in LTE (e.g., control channel, data channel, etc.). In another configuration, a single component carrier 116 may not have or carry both uplink and downlink transmissions. In an FDD configuration, for example, only uplink component carriers and downlink component carriers may be used (e.g., each component carrier 116 may be exclusively dedicated to only uplink transmissions or downlink transmissions). In a TDD configuration, for example, only uplink component carriers and downlink component carriers may be used, or a component carrier 116 may carry both uplink and downlink transmissions.

Downlink channels 118a-n are used to send information from the base station 110 to the wireless communication device 102. Uplink channels 120a, 120u are used to send information from the wireless communication device 102 to the base station 110. The downlink channels 118a-n and/or uplink channels 120a, 120u may be dedicated to the wireless communication device 102 or shared with other wireless communication devices. Different kinds of channels 118, 120 may be used. For example, a downlink channel 118 and/or uplink channel 120 may be used to communicate control information and/or data information.

The wireless communication device 102 includes a feedback value determination module 104 and a feedback overhead reduction module 106. The feedback value determination module 104 may be a hardware and/or software module used to determine feedback values corresponding to the component carriers 116a-n or downlink channels 118a-n. For example, the feedback value determination module 104 may use measurements such as Signal to Noise Ratio (SNR), Bit Error Rate (BER), received phase, frequency or time measurements, signal strength (e.g., power), etc. corresponding to each of the downlink channels 118a-n to determine feedback values. The feedback values may be determined according to a particular scheme or scale. Channel Quality Information or Indicators (CQI), Precoding Matrix Indicators (PMI) and Rank Indicators (RI) are examples of feedback values.

The feedback overhead reduction module 106 may be a hardware and/or software module used to reduce the amount of information used to represent the feedback values. For example, the feedback overhead reduction module 106 may reduce the number of bits used to represent feedback values or may reduce the amount of resources used to convey a feedback representation to the base station 110. In other words, the feedback overhead reduction module 106 may generate reduced overhead feedback values based on the feedback values determined by the feedback value determination module 104.

The feedback values and/or reduced overhead feedback values may be formatted into or expressed as one or more feedback messages 122a, 122u. The reduced overhead feedback messages 122 may be sent on an uplink channel 120 to the base station 110. For example, feedback messages A 122a may be sent on uplink channel A 120a and/or feedback messages U 122u may be sent on uplink channel U 120u.

The base station 110 may include a feedback message interpretation module 112. The feedback message interpretation module 112 allows the base station 110 to interpret the feedback messages 122. For example, the feedback message interpretation module 112 contains information used to correctly interpret the feedback messages 122. This information can be predetermined or determined dynamically. This information may be exchanged with the wireless communication device 102 or may be predetermined such that it does not need to be exchanged with the wireless communication device 102.

Figure 2:
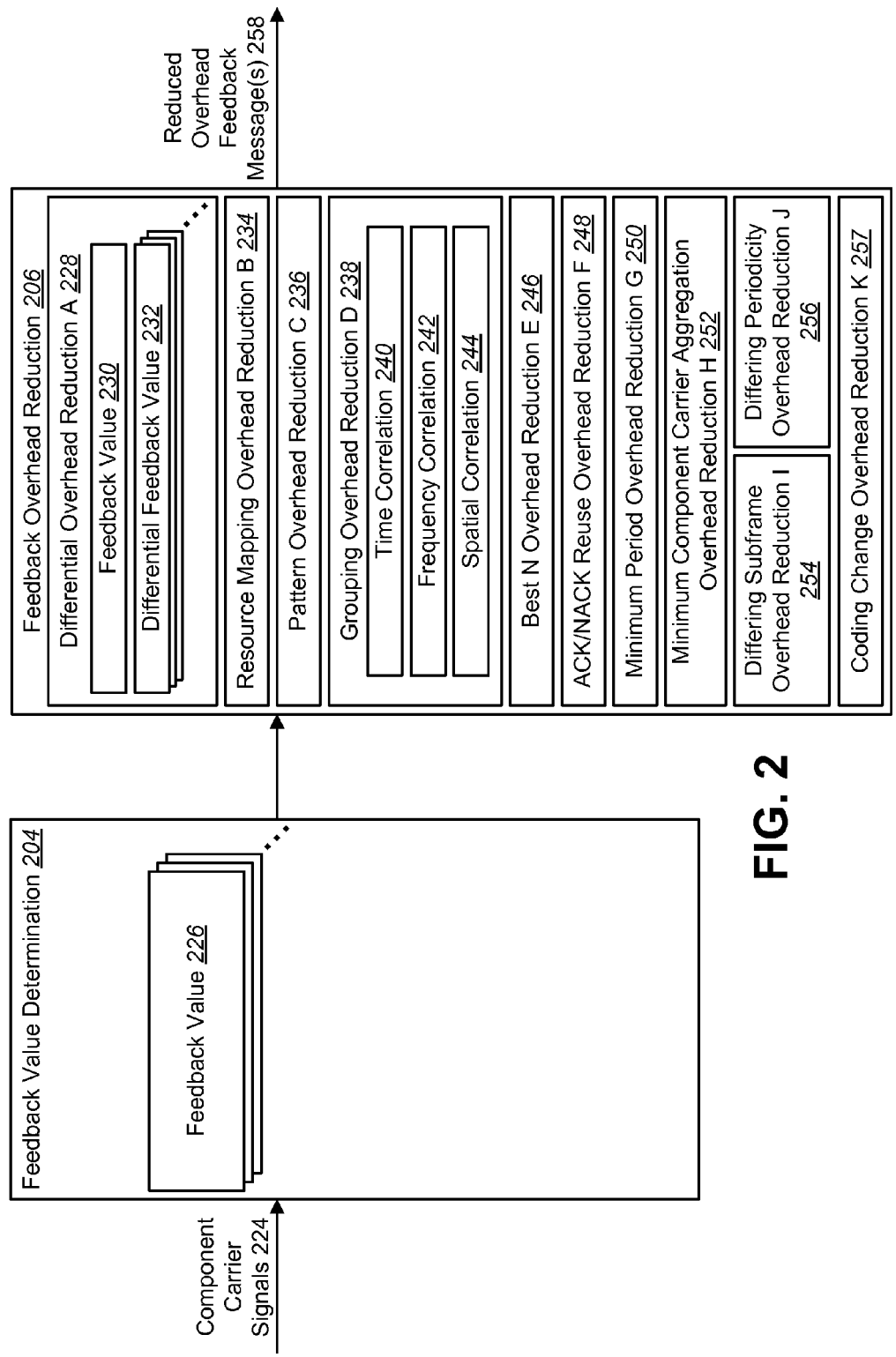
FIG. 2 is a block diagram illustrating several configurations of a feedback overhead reduction module for reducing feedback overhead for multiple component carriers.

FIG. 2 is a block diagram illustrating several configurations of a feedback overhead reduction module 206 for reducing feedback overhead for multiple component carriers. A feedback value determination module 204 uses component carrier signals 224 to generate one or more feedback values 226. More specifically, the feedback value determination module may use certain measurements (e.g., SNR, BER, signal power, phase, etc.) corresponding to the component carrier signals 224 to generate the one or more feedback values 226. For example, the feedback value determination module 204 may generate one or more CQIs, PMIs or RIs.

The one or more feedback values 226 may be used by the feedback overhead reduction module 206 to generate one or more reduced overhead feedback messages 258. In FIG. 2, several overhead reduction modules 228, 234, 236, 238, 246, 248, 250, 252, 254, 256 are illustrated. It should be noted, however, that the feedback overhead reduction module 206 may or may not include all of the overhead reduction modules 228, 234, 236, 238, 246, 248, 250, 252, 254, 256. Additionally or alternatively, the overhead reduction modules 228, 234, 236, 238, 246, 248, 250, 252, 254, 256 can be used individually or in any combination depending on the configuration. For example, the feedback overhead reduction module 206 may include and use only differential overhead reduction module A 228. In another configuration, the feedback overhead reduction module 206 may include and use the resource mapping overhead reduction module B 234 in addition to differential overhead reduction module A 228. In another configuration, the feedback overhead reduction module 206 may include and use all of the overhead reduction modules 228, 234, 236, 238, 246, 248, 250, 252, 254, 256. In yet another configuration, the feedback overhead reduction module 206 includes all of the overhead reduction modules 228, 234, 236, 238, 246, 248, 250, 252, 254, 256 but selects one or more for use at a time. Each of the overhead reduction modules 228, 234, 236, 238, 246, 248, 250, 252, 254, 256 may be implemented in hardware, software or a combination of both.

A brief explanation of each overhead reduction module 228, 234, 236, 238, 246, 248, 250, 252, 254, 256 is given hereafter. Differential overhead reduction module A 228 reduces feedback overhead by reducing the number of bits used to express multiple feedback values 226. When the systems and methods disclosed herein are not used, for example, each feedback value 226 corresponding to a component carrier 116 might be expressed as a feedback message 122 using a number of bits. Differential overhead reduction module A 228 may express one or more feedback values 226 as feedback messages 122 using the full number of bits. For example, one of the feedback values 226 may be a feedback value 230 corresponding to a "reference" component carrier that is expressed as a feedback message 112 using the full number of bits. The feedback value 230 corresponding to the reference component carrier may be referred to as a reference feedback value. The reference component carrier may be an "anchor" component carrier (e.g., a designated or selected component carrier), a primary component carrier (e.g., a designated or selected component carrier), or a component carrier corresponding to a best feedback value. Alternatively, the reference (e.g., primary) component carrier may be any one of the carriers which may be periodically cycled. Differential overhead reduction module A 228 may determine differential feedback values 232 (based on the remaining feedback values 226) that can be expressed as reduced overhead feedback messages 258 using fewer bits. It should be noted that an anchor component carrier may change slowly or be fixed while a primary component carrier may cycle periodically.

In one configuration, for example, the reference feedback value 230 may be a CQI of 5 that can be expressed as a feedback message 122 using three bits: 101. Assume remaining CQI feedback values 226 of 6, 5 and 3. Thus, the differential feedback values 232 would be 1, 0 and −2 (with respect to the reference feedback value 230). Two bits may be used to express these differential feedback values 232 as reduced overhead feedback messages 258. Assume, for instance, that the two bits are mapped or correspond to the differential feedback values 232 as {00, 01, 10, 11} to {−2, 0, 1, 2}. Thus, instead of expressing the remaining feedback values 226 as 110, 101 and 011 (using three bits each), differential overhead reduction module A 228 expresses the differential feedback values 232 as reduced overhead feedback messages 258 of 10, 01 and 00 (using two bits each).

Resource mapping overhead reduction module B 234 may use an implicit mapping function to reduce feedback overhead. In one configuration, resource mapping overhead reduction module B 234 may send a feedback message 122 or a reduced overhead feedback message 258 using a communication resource that is designated as corresponding to a particular component carrier 116. A communication resource may comprise a particular time, frequency and/or spatial resource. For example, one communication resource is a particular time slot on a particular frequency on a particular spatial channel. This communication resource may be designated as corresponding to a particular component carrier.

For example, assume that the reference feedback value 230 is a "best" CQI. Typically, the base station 110 may not "know" or have information regarding which component carrier corresponds to the best CQI and the differential CQIs (e.g., differential feedback values), unless it is explicitly signaled. However, according to the systems and methods disclosed herein, the base station 110 may have information indicating that a feedback message 122 sent using a particular communication resource corresponds to a particular component carrier 116.

In another configuration, resource mapping overhead reduction module B 234 uses a grouping sent to the wireless communication device 102 to indicate a grouping for a reduced overhead feedback message 258. For example, the base station 110 may send information (e.g., control information) about a group of component carriers 116 on a downlink channel 118. Resource mapping overhead reduction module B 234 may determine or select a single feedback value 226 to represent all of the feedback values in the group of component carriers 116 indicated by the downlink signaling.

Resource mapping overhead reduction module B 234 may send a single reduced overhead feedback message 258 corresponding to the single (determined or selected) feedback value 226. Thus, while the feedback value 226 may be expressed using the full number of bits, it may be considered a reduced overhead feedback message 258 since it uses fewer bits (one feedback message) to represent several component carrier feedback values 226. In other words, the reduced overhead feedback message 258 may be a feedback value 226 in some cases. The base station 110 may be aware of which group of component carriers the single reduced overhead feedback message 258 corresponds to. This also reduces overhead because the grouping does not need to be explicitly signaled to the base station 110.

Pattern overhead reduction module C 236 may reduce feedback overhead by using different patterns for feedback value (e.g., CQI reports). In Release-8, for example, the CQI for two (e.g., both) code words corresponding to one component carrier 116 can be fed back at one time instant. With the extension of multiple component carriers 116, one can extend this to allow for quicker and fairer reporting from all of the component carriers 116. One such example would be that at one sub frame, if one code word is fed back from one component carrier, the other code word is from an adjacent component carrier. For instance, in Release-8 rank-2 downlink MIMO transmission, the CQI for each code word can be fed back. For instance, for a component carrier CC1, CQI_11 and CQI_12 may be reported at each time instance. If there is a second component carrier (CC2), CQI_21 and CQI_22 may be reported in another time instance. Using pattern overhead reduction, for example, CQI_11 may be reported with CQI_21 or CQI_22. Furthermore, CQI_21 and/or CQI_22 may be differentially encoded with respect to CQI_11.

Grouping overhead reduction module D 238 may be used to send a single reduced overhead feedback message 258 for a group of component carriers 116. For example, grouping overhead reduction module D 238 may report a single feedback value 226 (expressed as a feedback message 122 or reduced overhead feedback message 258) for a group of component carriers 116 (i.e., a group of feedback values 226 corresponding to a group of component carriers). Thus, while the feedback value 226 may be expressed using the full number of bits, it may be considered a reduced overhead feedback message 258 since it uses fewer bits (one feedback message) to represent several component carrier feedback values 226. In one configuration, a composite feedback value such as an average feedback value (or an integer feedback value nearest to an average feedback value) may be used. For example, an average CQI value may be computed by averaging CQI values over all of the component carriers 116. The average CQI value may be (or be formatted into) the reduced overhead feedback message 258 for the group of component carriers 116. In another configuration, grouping overhead reduction module D 238 selects one representative feedback value 226 for the group of component carriers 116.

Grouping overhead reduction module D 238 may group (or select a group of) component carriers 116. A single reduced overhead feedback message 258 corresponding to a representative feedback value may be determined and sent for the selected group of component carriers 116 by grouping overhead reduction module D 238. The grouping may be based on a criterion or several criteria.

In one configuration, for example, the grouping may be based on one or more time correlations 240, frequency correlations 242 and/or spatial correlations 244 between component carriers 116. For example, grouping overhead reduction module D 238 may group component carriers 116 that are closely correlated in time, frequency and/or space. In one configuration, grouping overhead reduction module D 238 uses time, frequency and/or spatial correlation thresholds. For example, if the time, frequency and/or spatial correlation between two component carriers 116 satisfies respective time, frequency, and/or spatial correlation thresholds, then grouping overhead reduction module D 238 groups the component carriers 116. One reduced overhead feedback message 258 may be sent for the entire group. In other words, any form of feedback that is relatively time/frequency/spatially invariant does not need to be reported for each component carrier 116 separately (or may be reported at a slower rate than a varying component—which is described in greater detail below).

In another configuration, grouping overhead reduction module D 238 may group component carriers 116 that are not correlated in time, frequency and/or space. In other words, grouping may be used even when the component carriers 116 are not correlated in order to reduce overhead. For instance, the grouping overhead reduction module D 238 may simply group a number of component carriers and send a reduced overhead feedback message 258 for the entire group.

More restrictions may be placed on the feedback values 226 or messages 258 (e.g., CQIs, PMIs, RIs, etc.) to reduce the overhead in the case where component carriers 116 are adjacent to each other. For example, if two component carriers 116 are close in frequency, the two component carriers 116 may be treated as one for the purpose of PMI/CQI/RI reporting. In one configuration, Release-8 mechanisms could be extended to consider the two component carriers 116 as one component carrier 116. It should be noted that this might entail expanding the number of Physical Resource Blocks (PRBs) as defined in Release-8. For instance, the PRBs are currently defined from 6 to 110. However, it might be necessary to increase the maximum number of PRBs to above 110 for the multiple component carrier 116 case. In the event that one component carrier 116 carries Physical Downlink Control Channel (PDCCH) transmissions for multiple component carriers 116, this scheme may be useful—especially for a wideband CQI indicator since wideband CQI is related to the PDCCH transmission. For example, multiple component carriers 116 may be correlated in some domain (e.g., contiguous in frequency). The PDCCH may be transmitted from only one component carrier. A single aggregated wideband CQI may be reported which is obtained by averaging over the multiple component carriers 116.

In general, any form of feedback that is relatively time, frequency or spatially invariant may not need to be reported from each component carrier separately (or may be reported at a slower rate than a varying component). In one configuration, for example, feedback which is related to long-term characteristics (hence varies slowly) may be reported at a slower rate or at a longer interval compared to short-term feedback that varies more rapidly. In Release-10, for instance, two forms of feedback may be used: long-term and short-term feedback. If one form of feedback (e.g., long-term feedback) is relatively invariant to the component carriers 116 then separate feedback may not be needed for each component carrier 116 (or feedback may be sent at a slower rate compared to short-term feedback). For example, the precoding matrix indicator (PMI) or a relatively invariant component of the PMI need not be reported on a per-component carrier 116 basis, but the same PMI may be used over multiple component carriers 116. However, this can be generalized to any form of feedback that might be independent of the component carrier frequency (e.g., long-term feedback that captures correlation properties of the channel in the time, frequency or spatial domain).

Best N overhead reduction module E 246 may report only the "best N" feedback values 226 for a group of component carriers 116. For example, assume that overhead reduction module E 246 obtains 5 feedback values 226 corresponding to 5 component carriers. Overhead reduction module E 246 may report the best N=2 feedback values 226 by sending only 2 reduced overhead feedback messages 258 (e.g., using full bits) corresponding to the 2 best feedback values 226 for the 5 component carriers. For example, the concept of a best CQI report may be generalized. In this scheme, instead of reporting only the best CQI, the UE can sort the CQI over multiple component carriers and report the best 'N' out of 'M' CQIs from different component carriers, where M is the number of downlink component carriers and $N \leq M$.

Acknowledgement/Negative Acknowledgment (ACK/NACK) reuse overhead reduction module F 248 may send feedback messages 122 (or reduced overhead feedback messages 258) only when they don't collide with ACK/NACK messages. In other words, the ACK/NACK reuse overhead reduction module F 248 may drop or not send feedback messages 112 (or reduced overhead feedback messages 258) when a collision occurs (and both ACK/NACK and CQI cannot be transmitted jointly, for example), instead sending only the ACK/NACKs (using a format that may typically be used for jointly sending ACK/NACKs and feedback messages, for example). For example, if there are enough ACK/NACK messages such that the ACK/NACKs cannot be sent in the same subframe as the feedback message(s) 122, 258, then the feedback message(s) 122, 258 may not be sent. In one configuration, a format that is typically used to jointly carry ACK/NACK and feedback messages 122, 258 may be used to carry only ACK/NACK messages when a collision occurs. Thus, the feedback message(s) 112, 258 may not be sent. For instance, Format 2 as defined in Release-8 may be reused for ACK/NACK transmission in the case of an ACK/NACK collision with CQI. Currently in Release-8, for instance, in the event that an ACK/NACK collides with CQI, the ACK/NACK is transmitted but with a different format (i.e., Format 1). More specifically, in Release-8, ACK/NACK by itself may typically be carried on Format 1a/1b. When there is an ACK and CQI/PMI/RI collision and the parameter simultaneousAckNackAndCQI provided by higher layers is set to TRUE, they may typically be jointly carried using Format 2/2a/2b. In the event of an ACK/NACK collision with CQI and the above parameter (simultaneousAckNackAndCQI) is not set to TRUE, CQI is dropped and ACK/NACK is transmitted using Format 1a/1b. According to the systems and methods disclosed herein, however, in the event of a collision and the above parameter (simultaneousAckNackAndCQI) is set to FALSE, CQI/PMI/RI may be dropped and the ACK/NACK uses Format 2/2a/2b for only ACK/NACK transmissions. That is, there is no need to revert to Format 1a/1b as in Release-8.

Minimum period overhead reduction module G 250 may place a limit on how often feedback messages 122 or reduced overhead feedback messages 258 may be sent. More specifically, any feedback messages 122, 258 cannot be periodically sent with a period shorter than a minimum period limitation placed by minimum period overhead reduction module G 250. In Release-8, for example, the minimum periodicity for wideband feedback is 2 ms. In Release-10, however, using a 2 ms periodicity may be problematic since the feedback may be much more than that of Release-8 (e.g., 5 times that of Release-8 if there are 5 component carriers). According to the systems and methods disclosed herein, therefore, the minimum periodicity (e.g., for Release-10 for 5 component carriers) may be larger than 2 ms.

Minimum component carrier aggregation overhead reduction module H 252 may require a minimum number of component carriers 116 for which a feedback message 122, 258 may be sent. More specifically, overhead reduction module H 252 may allow only one feedback message 122, 258 to be sent for each minimum number or more component carriers 116. For example, if a minimum aggregation number is 2 and there are 5 component carriers 116, overhead reduction module 252 will only allow a single feedback message 122 (e.g., a single CQI) to be sent corresponding to 2 or more (e.g., 3, 4, 5) component carriers.

In Release-8, for example, wideband and UE-selected subband feedback is possible for periodic CQI reporting. Furthermore, the period for periodic CQI reporting can be configured to periods of 2, 5, 10, 16, 20, 32, 40, 64, 80, 128 or 160 milliseconds (ms). With the introduction of multiple component carriers 116, the 2 ms and 5 ms periodicity (or even 10 ms periodicity) imposes a constraint on the control overhead, since all of the control capacity may be used to transmit a CQI indicator. Hence, restrictions may be imposed on the periodicity for multiple component carrier 116 periodic CQI reporting. For example, a restriction may be imposed on the minimum period for CQI reporting for multiple component carriers 116. Additionally or alternatively, a restriction may be imposed on the minimum number of component carriers 116 that need to be aggregated for the purpose of CQI reporting (e.g., in cases of low periodicity such as 2 ms and 5 ms).

Differing subframe overhead reduction module I 254 may allow feedback messages 122, 258 or parts of feedback messages 122, 258 to be sent in the same or differing subframes. For example, a Precoding Matrix Indicator (PMI) may be determined based on two matrices. Overhead reduction module I 254 allows the two matrices to be sent in differing subframes. This may allow differing periodicity overhead reduction module J 256 to send one of the matrices less often than the other, thereby reducing overhead.

Differing periodicities may be an example of long-term and short-term feedback. For example, a precoding matrix W for a subband is a function of two matrices W1 and W2. For instance, W1∈C1 and W2∈C2. The codebooks C1 and C2 are codebooks one and two, respectively. The first matrix W1 targets wideband/long-term channel properties, while the second matrix W2 targets frequency-selective/short-term time channel properties. The feedback corresponding to W1 and W2 may be configured to be sent in the same subframe or in different subframes. For example, W1 and W2 may be reported with different periodicities. Moreover, a joint W1 may be reported for multiple component carriers 116.

More details and examples of feedback values 226 and/or feedback messages 122, 258 in the context of CQIs are given below. Although the further details and/or examples are given in the context of CQIs, they may also apply to other kinds of feedback values 226 and/or messages 122, 258 (e.g., PMIs, RIs, etc.). Some examples of different overhead reduction modules to reduce periodic CQI overhead in multiple component carrier deployment scenarios are described.

Coding change overhead reduction module K 257 may allow the channel capacity for carrying a feedback message to be increased. For example, an uplink control channel (e.g., Physical Uplink Control Channel or PUCCH) may carry a variable length of bits of a feedback message with a range from 1 to 22 bits. If multiple component carriers 116 (e.g., downlink component carriers) are used, a larger bit length may be used on one PUCCH for carrying a feedback message than in a one component carrier case.

For instance, a 2-bit RI may be sent on one PUCCH. However, 2-bit reporting on one PUCCH may have too much robustness. According to the systems and methods disclosed herein, RIs for several component carriers 116 may be carried by one PUCCH. For example, if 3 RIs are included or combined in one feedback message, one PUCCH carries 6 bits of information. The coding rate may thus be higher, but the PUCCH may still have sufficient robustness. This may reduce the delay of feedback since the RI reporting cycle may be reduced compared to the case where RIs for different component carriers are reported in different instances of a PUCCH. In general, the coding change overhead reduction module 257 may produce a reduced overhead feedback message 258 by combining multiple feedback values 226 or messages 122 and sending them on a single uplink channel (or on a single instance of the uplink channel (e.g., PUCCH)). In this case, the reduced overhead feedback message 258 may comprise multiple feedback values 226 of regular length that are combined.

In another example, a 4-bit wideband CQI is sent on one PUCCH, but 4 bits of reporting on one PUCCH may have too much robustness for the CQI. For example, CQI may not need more robustness than RI. According to the systems and methods disclosed herein, wideband CQIs for several component carriers may be carried by one PUCCH. For example, if 3 wideband CQIs are included in one feedback message, one PUCCH carries 12 bits of information. The coding rate may be higher, but the PUCCH may still have sufficient robustness. This may also reduce the delay of feedback because a wideband CQI reporting cycle may be reduced compared to the case where wideband CQIs for different component carriers are reported in different instances of a PUCCH. This approach may also be similarly applied to PMI or subband CQI reporting.

Differential overhead reduction module A 228 may use differential feedback (across component carriers 116) for reporting CQIs for multiple component carriers 116. That is, instead of reporting the actual CQI value 226 of the different component carriers 116, the CQI difference 232 with respect to a reference component carrier 116 (which may be an anchor component carrier 116, a primary component carrier or the best CQI component carrier 116) is reported.

It should be noted that the granularity of differential component carrier 116 CQI reporting may be chosen such that more bits are allocated to report better quality CQI compared to worse CQI. For example, the possible CQI differential values may be {−2, 0, 1, 2}, which shows that component carriers 116 that have lower CQI than the reference component carrier 116 have fewer CQI possibilities (e.g., {−2}) compared to the CQI of component carriers 116 having better states {1, 2}. In another configuration, the possible CQI differential values may be {≦−2, 0, 1, ≧2}. The upper and lower values in this configuration reflect that a CQI (for a second component carrier) may be outside of the range that may be represented by 2 bits.

It should be further noted that an unequal number of bits may be used for multiple component carrier CQI reporting. The number of bits used may depend on a frequency separation. For example, component carriers 116 nearer to the reference component carrier may use an unequal number of bits to report the channel quality compared to component carriers 116 farther from the reference carrier. For instance, a reduced overhead feedback message 258 corresponding to a component carrier 116 that is closer to a reference component carrier in frequency may comprise shorter bit sequences than a reduced overhead feedback message 258 corresponding to a component carrier that is farther from the reference component carrier in frequency.

Resource mapping overhead reduction module B 234 may reduce the overhead of reporting the component carrier 116 corresponding to a particular CQI by using an implicit uplink channel 120 (e.g., Physical Uplink Control Channel or PUCCH) mapping function instead of directly reporting. This may save the bits required to indicate or signal a corresponding component carrier 116 (e.g., to the base station 110). Furthermore, resource mapping overhead reduction module B 234 may report aggregated channel information (e.g., 1 CQI) for all component carriers 116 that are indicated by the same downlink channel (e.g., Physical Downlink Control Channel or PDCCH) signaling. For example, a group of component carriers 116 may be indicated in Radio Resource Control (RRC) signaling or in an RRC message. Aggregated channel information for this group of component carriers 116 may be reported.

Grouping overhead reduction module D 238 may use time correlation 240, frequency correlation 242 and/or spatial correlation 244 to reduce the number of reported CQIs over different component carriers 116. Furthermore, any form of feedback that is relatively time/frequency/spatial invariant need not be reported from each component carrier separately (or may be reported at a slower rate than the varying component—which is described in greater detail above). For example, differing periodicity overhead reduction module J 256 may keep or maintain the precoding matrix indicator (PMI) or long-term matrix (W1 as described above) reporting the same for different component carriers 116 (instead of changing on a per-component carrier 116 basis).

Best N overhead reduction module E 246 may reduce feedback (e.g., CQI) overhead for multiple component carriers 116 by ordering or ranking the feedback values from different component carriers 116 and reporting the best chosen or selected component carriers 116 (e.g. best 2 or 3 component carriers 116) instead of all the component carriers 116. In other words, the wireless communication device 102 may rank the feedback values, select a number of best feedback values, generate feedback messages based on the best feedback values and send only those feedback messages.

ACK/NACK reuse overhead reduction module F 248 may reduce overhead usage. For example, in the event the ACK/NACK collides with CQI during periodic reporting (e.g., the ACK/NACK payload is such that both ACK/NACK and CQI cannot be transmitted in the same subframe), the CQI is not reported and the same format reused (with same number of coded bits as would have been transmitted when CQI and ACK/NACK were multiplexed together) for ACK/NACK reporting only.

Figure 3:
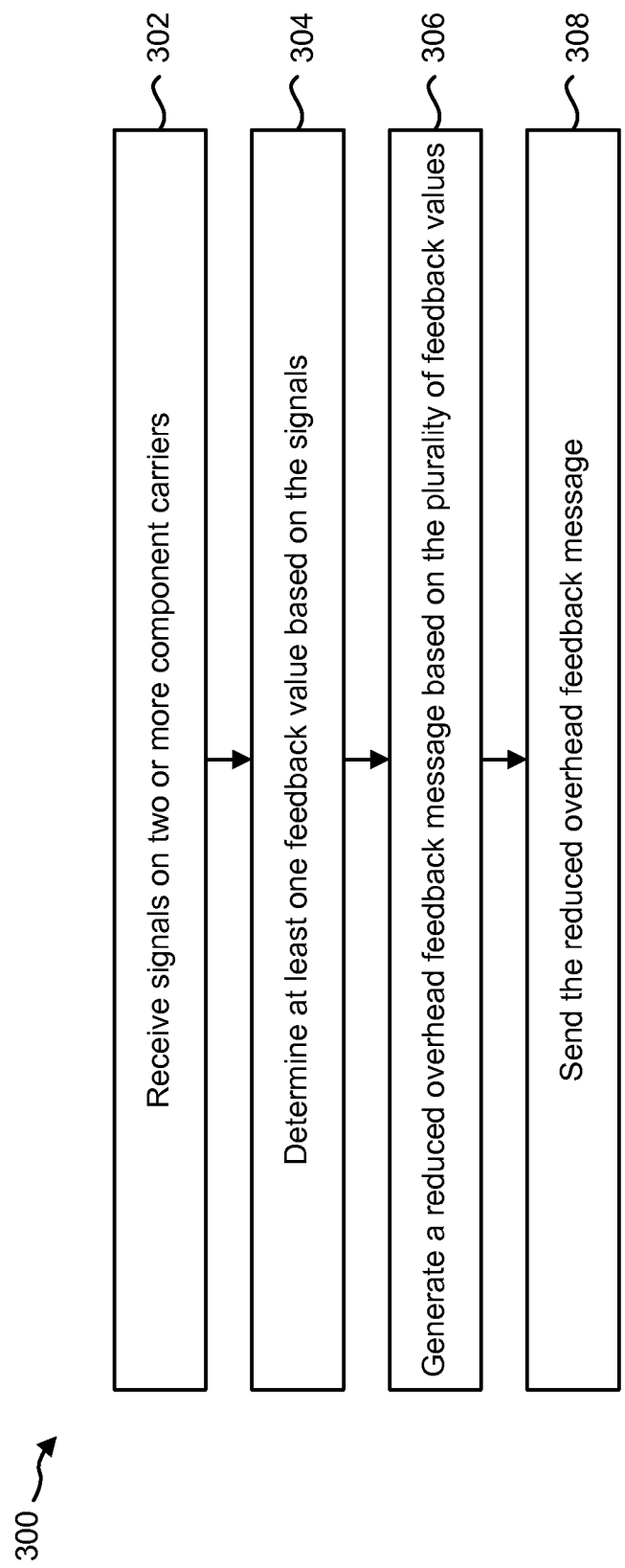
FIG. 3 is a flow diagram illustrating one configuration of a method for reducing feedback overhead for multiple component carriers.

FIG. 3 is a flow diagram illustrating one configuration of a method 300 for reducing feedback overhead for multiple component carriers. A wireless communication device 102 may receive 302 signals (e.g., component carrier signals 224) on two or more component carriers 116. The wireless communication device 102 may determine 304 at least one feedback value (e.g., CQIs, PMIs, RIs, etc.) based on the signals. For example, a feedback value determination module 104 may use signal measurements such as SNR, BER, signal power, phase, etc. to determine 304 one or more feedback values.

The wireless communication device 102 may generate 306 a reduced overhead feedback message 258 based on the plurality of feedback values. For example, the wireless communication device 102 may generate 306 a reduced overhead feedback message 258 based on a differential feedback value. Furthermore, the wireless communication device 102 may generate 306 a reduced overhead feedback message by using or selecting a single reduced overhead feedback message 258 or feedback value 226 for multiple component carriers 116 (e.g., a single feedback message 122 or value 226 using full bit representation in place of multiple feedback messages 122).

The wireless communication device 102 may send 308 the reduced overhead feedback message 258. In some configurations, the reduced overhead feedback message 258 may not be sent 308 if there is an ACK/NACK collision. For example, if there is an ACK/NACK collision, the reduced overhead feedback message 258 may be dropped and the ACK/NACK only may be sent using a format that is typically used to jointly send ACK/NACK and feedback messages. More detail is given above. In other words, the reduced overhead feedback message 258 may only be sent 308 when there is no ACK/NACK collision in those configurations. For example, the ACK/NACK is sent and the CQI dropped only when the ACK/NACK and CQI together has a larger payload than what can be sent over the control channel. Otherwise, both ACK/NACK and CQI may be jointly coded and sent over the control channel. More detail is given above in connection with the ACK/NACK reuse overhead reduction module F 248.

Figure 4:
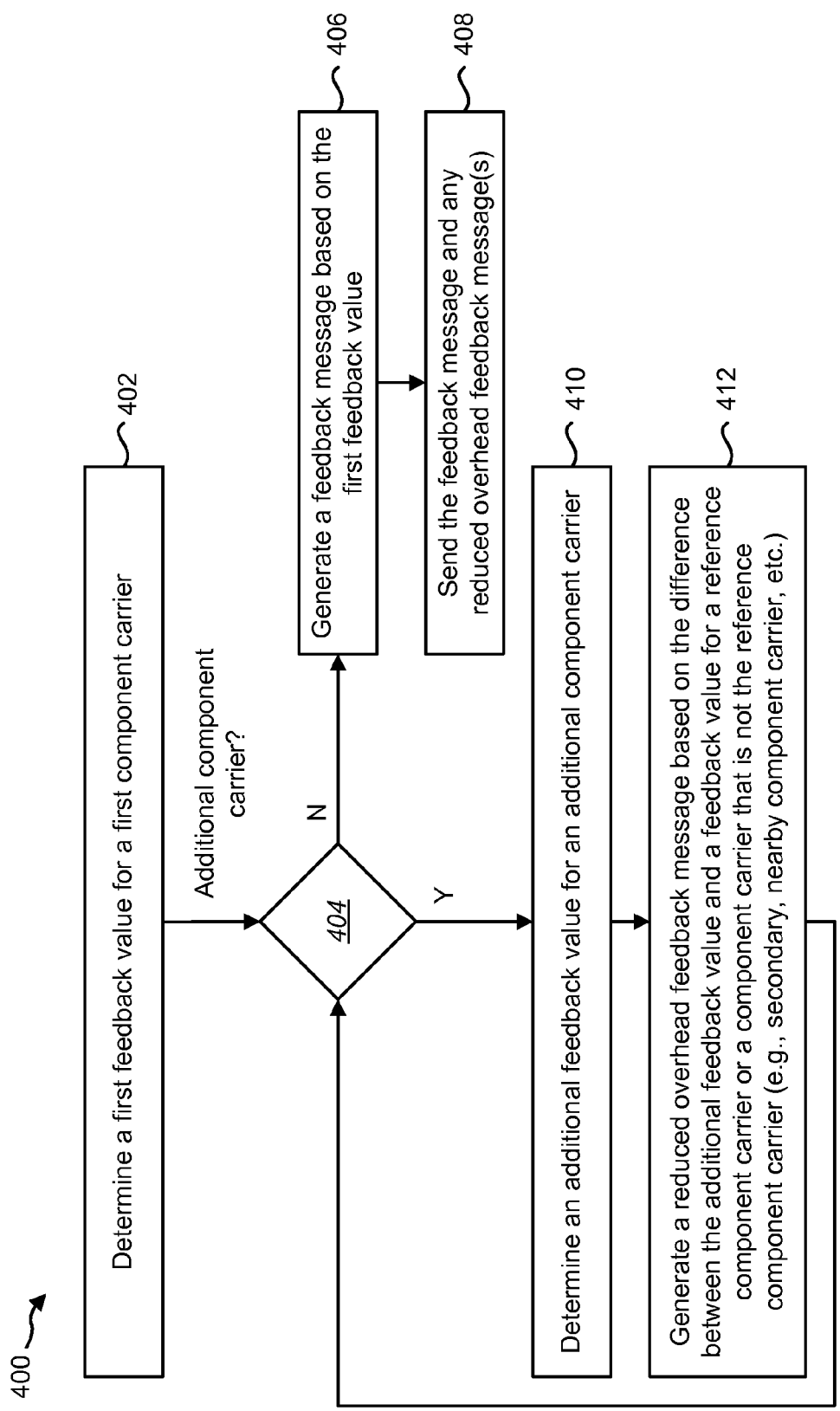
FIG. 4 is a flow diagram illustrating a more specific configuration of a method for reducing feedback overhead for multiple component carriers.

FIG. 4 is a flow diagram illustrating a more specific configuration of a method 400 for reducing feedback overhead for multiple component carriers. FIG. 4 more specifically illustrates the functionality of a differential overhead reduction module. The wireless communication device 102 may determine 402 a first feedback value for a first component carrier 116. The first feedback value may be a "reference" feedback value. In other words, a reference feedback value corresponds to a reference component carrier, which may be an anchor component carrier, a primary component carrier or a component carrier corresponding to a best feedback value, for example. An anchor component carrier may change slowly or be fixed while a primary feedback carrier (which may be a reference feedback carrier) may cycle periodically. For example, in a first time instance, a first component carrier may be a reference component carrier. In a second time instance, a second component carrier may be the reference component carrier for the purpose of CQI reporting. More specifically, the primary component carrier may be the reference component carrier which carries a full uncompressed CQI report in one case. The reference component carrier may or may not be related to the anchor carrier or primary carrier as defined in LTE Release-10 specifications, for example.

The reference feedback value is a feedback value that may be represented as a feedback message 122 with full bit representation. Examples of a reference feedback value include an "anchor" feedback value, a "primary" feedback value and a "best" feedback value. An anchor feedback value may correspond to a designated, selected or "anchor" component carrier 116. A best feedback value may be the best feedback value out of multiple feedback values. In the case where the feedback values are CQIs, for example, a CQI indicating the highest quality channel (e.g., the CQI with the highest number) may be selected as the best feedback value. The best feedback value may be determined once a number of feedback values have been obtained or determined.

The wireless communication device 102 may determine 404 whether there is an additional component carrier 116. For example, the wireless communication device 102 may determine whether it 102 does not yet have a feedback value for an additional component carrier 116 being used. If the wireless communication device 102 does not have an additional component carrier 116, it 102 may generate 406 a feedback message based on the first (e.g., reference) feedback value. For example, the wireless communication device 102 may format the first (e.g., reference) feedback value as a sequence of bits using full bit representation. For example, the reference feedback value will be represented with at least the minimum number of bits necessary to represent the feedback value. For instance, if the reference feedback value is a CQI with a value of 6, the wireless communication device 102 may represent the CQI using 3 bits as 110 (or any other 3 bit representation).

The wireless communication device 102 may send 408 the feedback message and any reduced overhead feedback messages. For example, the feedback message corresponding to the reference feedback value may be sent 408. Furthermore, any differential feedback messages (e.g., reduced overhead feedback messages) may also be sent 408.

If the wireless communication device 102 determines 404 that there is an additional component carrier 116 being used (for which it does not yet have a feedback value), it 102 may determine 410 an additional feedback value for an additional component carrier. For example, the feedback value determination module 104 may determine 410 a feedback value for the additional component carrier using measurements such as SNR, BER, signal strength, phase error, etc.

The wireless communication device 102 may generate 412 a reduced overhead feedback message 258 based on the difference between the additional feedback value and a feedback value for a reference component carrier or a feedback value for a component carrier that is not the reference component carrier (e.g., a secondary component carrier, a nearby component carrier, etc.). In one configuration, the wireless communication device 102 generates 412 the reduced overhead feedback message 258 based on the difference between the additional feedback value and the feedback value for reference component carrier 116. The reference component carrier 116 may be an "anchor" component carrier 116, a primary component carrier 116, a "best" component carrier 116 (e.g., a component carrier with the best feedback value), or any component carrier with the component carrier being cycled periodically.

In one configuration, for example, a differential feedback value may be determined according to Equation (1).

$$\text{Differential\_Feedback\_Value}_j = \text{Feedback\_Value}_i - \text{Feedback\_Value}_j \quad (1)$$

In Equation (1), Feedback_Value$_i$ is the feedback value corresponding to a reference component carrier, Feedback_Value$_j$ is the feedback value corresponding to another component carrier (at index j) and Differential_Feedback_Value$_j$ is the differential feedback value corresponding to the component carrier at index j. For example, if the CQI value corresponding to the reference component carrier 116 is 6 and the CQI value corresponding to the additional component carrier 116 is 4, then the differential CQI value corresponding to the additional component carrier 116 is −2=4−6. The reduced overhead feedback message 258 may be generated 412 based on this differential CQI value. Assume, for this example, that two bits will be used for the reduced overhead CQI value and that the differential CQI values of {−2, 0, 1, 2} correspond to or are mapped to the bit sequences {00, 01, 10, 11}. In this example, the reduced overhead CQI (feedback) value 258 is thus generated 412 as the bit sequence 00. It should be noted that the differential in Equation (1) may be with respect to the feedback value in a time, frequency and/or spatial domain. It should also be noted that in this configuration, additional reduced overhead feedback messages may each be determined with respect to the feedback value corresponding to the reference (e.g., anchor, primary or best) component carrier 116. For instance, the wireless communication device 102 may return to determining 404 whether there is an additional component carrier.

In one configuration, reducing feedback overhead for multiple component carriers may be accomplished by the use of a component carrier differential CQI report. In using this approach, the CQI (e.g., wideband CQI for component carriers 116) is differentially encoded compared to the CQI of a reference component carrier 116 (which may or may not be the anchor component carrier 116). For example, a CQI differential or offset can be defined for one component carrier 116 with respect to another as illustrated in Equation (2).

$$CQI\_Differential\_For\_Component\_Carrier_j = CQI\_For\_Component\_Carrier_i - CQI\_For\_Component\_Carrier_j \quad (2)$$

Thus, instead of directly reporting the CQI for all component carriers 116, the differential CQI (with respect to a reference component carrier 116) is reported. This may be particularly beneficial for component carriers 116 that are located near (e.g., in frequency) the reference reported component carrier 116, since it is likely that the CQI would be similar for these component carriers 116. Hence, a full reporting of CQI would incur additional overhead. The differential in Equation (2) may be with respect to the CQI in a time, frequency and/or spatial domain.

For example, consider three bits for CQI reporting. The possible states are then 1, 2, 3, . . . , 8. Thus, for the reference component carrier, the three-bit index representing one of the possible indexes is chosen. However, for the adjacent component carrier, instead of reporting a three-bit index, only two bits may be chosen that represent the difference of CQI with respect to the reference as shown in Equation (2). This two-bit index could represent the possibilities {−2, 0, 1, 2}. Hence, if the CQI_For_Component_Carriers$_1$=4 and the CQI_For_Component_Carrier$_2$=6, the CQI report (e.g., feedback message) for component carrier 1 is 100 (three-bit direct report). The CQI report or feedback message for component carrier 2 is 11 (two-bit differential report where 11 represents a differential of 2 with respect to the reference component carrier).

Thus, instead of using a three-bit index (110) to represent 6, only two bits of information are used. Also, note that the granularity of the two-bit index in the above example is so chosen that the higher CQI files have finer granularity compared to lower CQI values. This is because a base station or eNodeB may be more likely to schedule good component carriers compared to poor ones.

In another configuration, a differential feedback value may be determined according to Equation (3).

$$Differential\_Feedback\_Value_k = Feedback\_Value_k - Feedback\_Value_j \quad (3)$$

In Equation (3), Feedback_Value$_j$ is a feedback value corresponding to a nearby component carrier or secondary component carrier (e.g., a component carrier that is not the reference component carrier) (at index j), Feedback_Value$_k$ is a feedback value corresponding to another component carrier (at index k) and Differential_Feedback_Value$_k$ is the differential feedback value corresponding to the component carrier at index k. For example, if the CQI value corresponding to a nearby component carrier 116 (or to a component carrier 116 that is not the reference component carrier) is 4 and the CQI value corresponding to the additional component carrier 116 is 5, then the differential CQI value corresponding to the additional component carrier 116 is 1=5−4. The reduced overhead feedback message 258 may be generated 412 based on this differential CQI value. Assume, for this example, that two bits will be used for the reduced overhead CQI value and that the differential CQI values of {−2, 0, 1, 2} correspond to or are mapped to the bit sequences {00, 01, 10, 11}. In this example, the reduced overhead CQI (feedback) value 258 is thus generated 412 as the bit sequence 10. It should be noted that in this configuration, additional reduced overhead feedback messages may each be determined with respect to a feedback value corresponding to a secondary component carrier (e.g., a component carrier that is not the reference component carrier) or a nearby component carrier 116. For instance, the wireless communication device 102 may return to determining 404 whether there is an additional component carrier.

It should be noted that although the term "nearby" is used, the component carrier with respect to which the difference is taken need not always be near or nearest to the additional component carrier. In other words, the component carrier (at index j, for example) may be any component carrier that is not the reference component carrier, whether nearby the additional component carrier or not. For example, assume that there are four component carriers (ordered by frequency, for example): CC1, CC2, CC3 and CC4. Assume that CC1 is the reference component carrier. Assume that a differential feedback value is computed for CC2 with respect to the reference component carrier CC1. A differential feedback value for CC3 may be computed with respect to CC1 or CC2. A differential feedback value for CC4 may be computed with respect to CC1, CC2 or CC3.

More specifically, the CQI for component carrier k can be defined similar to Equation (2) above (where k is substituted instead of j) or the differential is taken with respect to j in Equation (2). This is illustrated in Equation (4).

$$CQI\_Differential\_For\_Component\_Carrier_k = CQI\_For\_Component\_Carrier_k - CQI\_For\_Component\_Carrier_j \quad (4)$$

The approach illustrated in Equations (3) and (4) could be made particularly beneficial by ordering the component carriers in any predetermined order (e.g., frequency) and determining the differential over component carriers 116 that are close to each other in frequency. For example, the differential feedback value for a component carrier may be determined based on a neighboring component carrier's feedback value (e.g., and not based directly on a reference component carrier's feedback value, if the neighboring component carrier is nearer in frequency than the reference component carrier).

A more specific example follows. Assume that there are 3 component carriers: CC1, CC2 and CC3. In a first time instance, a full 4 bit report (representing a CQI, for example) for CC1 is made and 2 or 3 bit differential reports are made for CC2 and CC3. In the next time instance, a full 4 bit report for CC2 and 2 or 3 bit differential reports are made for CC3 and CC1. To elaborate further, reports for component carriers are given as follows: time instance 1: CC1 (4 bit), CC2 (3 bit), CC3 (2 bit); time instance 2: CC2 (4 bit), CC3 (3 bit), CC1 (2 bit); time instance 3: CC3 (4 bit), CC1 (3 bit), CC2 (2 bit).

This example illustrates that the reference (e.g., primary) component carrier for the purpose of full CQI reporting may cycle or change with time.

For multiple transmit antennas, the CQI for codeword 1 for component carrier j can be defined as illustrated in Equation (5).

$$\text{CQI\_Differential\_For\_Codeword}_1\_\text{In\_Component\_Carrier}_j = \text{CQI\_For\_Codeword}_0\_\text{In\_Component\_Carrier}_j - \text{CQI\_For\_Codeword}_1\_\text{In\_Component\_Carrier}_j \quad (5)$$

Equation (5) gives an example of spatial differential over multiple component carriers. Successive differential for code words for other component carriers may be accomplished as illustrated in Equation (6).

$$\text{CQI\_Differential\_For\_Codeword}_1\_\text{In\_Component\_Carrier}_k = \text{CQI\_For\_Codeword}_0\_\text{In\_Component\_Carrier}_j - \text{CQI\_For\_Codeword}_1\_\text{In\_Component\_Carrier}_j \quad (6)$$

Thus, the differential can be with respect to different code words over different component carriers. Different CQIs may have different granularities (e.g., component carriers that are close in frequency to the reference carrier may use a smaller (or greater) number of bits than component carriers that are farther apart). For instance, if the CQI of the reference component carrier uses four bits, then the adjacent component carrier can be represented by two (or three) bits instead of four and the CQI of farther component carriers (if the differential is with respect to the reference) may be represented by three (or four) bits. It should be noted that the term "adjacent" as used herein may not necessarily denote the nearest in frequency. For example, "adjacent" may denote adjacent for reporting purposes. For example, in a first time instance, a first component carrier CC1 and a second component carrier CC2 may be adjacent component carriers for CQI reporting. In another time instance (e.g., time instance 3), CC1 and a third component carrier CC3 may be adjacent.

Figure 5:
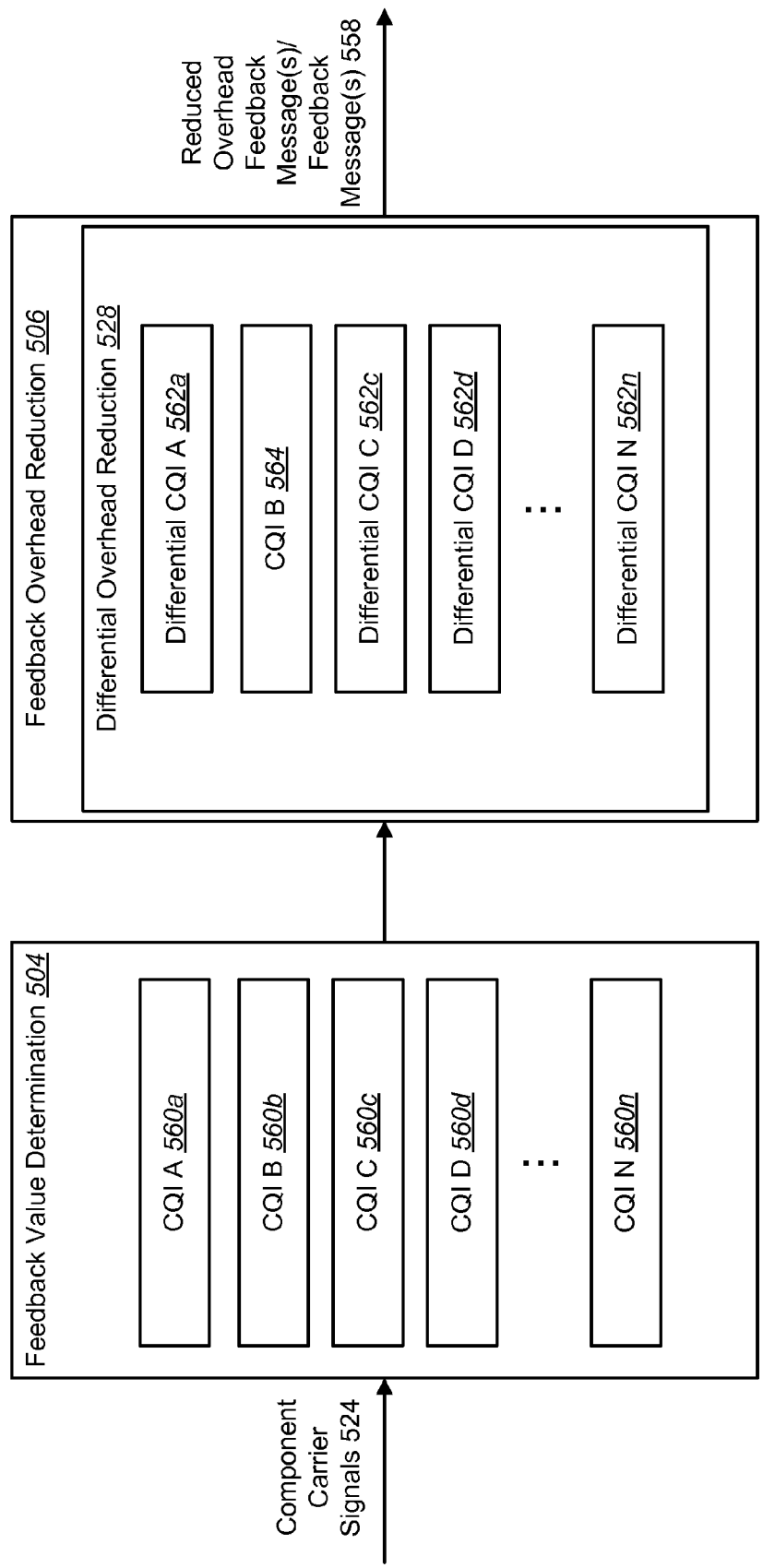
FIG. 5 is a block diagram illustrating one example of reducing feedback overhead for multiple component carriers.

FIG. 5 is a block diagram illustrating one example of reducing feedback overhead for multiple component carriers. In this example, the feedback values are CQIs. The feedback value determination module 504 uses component carrier signals 524 to determine CQIs 560a-n corresponding to each of the component carriers 116. The feedback overhead reduction module 506 uses a differential overhead reduction module 528. The differential overhead reduction module 528 uses the CQIs 560a-n from the feedback value determination module 504. In this example, the reference CQI is CQI B 564. That is, CQI B 564 could represent the CQI for an anchor component carrier 116, the CQI for a primary component carrier 116, or CQI B could be the best CQI out of CQI A through N 560a-n.

In one configuration, the differential overhead reduction module 528 determines several differential CQIs 562a, 562c-n with respect to CQI B 564. For instance, the differential overhead reduction module 528 computes the difference between CQI A 560a and CQI B 560b, CQI C 560c and CQI B 560b, CQI D 560d and CQI B 560b and so on, up to the difference between CQI N 560n and CQI B 560b. Computing each of these differences yields the differential CQIs 562a, 562c-n. Reference CQI B 564 may be represented using a number of bits to generate a feedback message 558. The differential CQIs 562a, 562c-n may be represented, each using fewer bits than CQI B 564 to yield reduced overhead feedback messages 558. The feedback message 558 representing CQI B 564 and the reduced overhead feedback messages 558 may be sent to a base station 110.

In another configuration, the differential overhead reduction module 528 may determine the differential CQIs 562a, 562c-n relative to CQIs corresponding to nearby component carriers 116. As used herein, the term "nearby" may mean nearby in frequency, time and/or space. For example, a differential CQI D 562d may be determined with respect to a nearby differential CQI C 562c. For instance, differential CQI C 562c may correspond to the nearest component carrier 116 in frequency to the component carrier 116 corresponding to CQI D 560d from one side (e.g., from a higher frequency or from a lower frequency). Furthermore, the differential CQIs 562a, 562c-n may be determined in a similar fashion. More specifically, differential CQI A 562a may be determined with respect to CQI B 564, differential CQI C 562c may be determined with respect to CQI B 564, differential CQI D 562d may be determined with respect to CQI C 562c, and so on until differential CQI N 562n may be determined with respect to a nearby CQI (e.g., CQI M, not shown). Reference CQI B 564 and the differential CQIs 562a, 562c-n may each be represented by a sequence of bits to generate the feedback message and reduced overhead feedback messages 558, which may be sent to a base station 110.

It should be noted that a nearby component carrier 116 may thus be an adjacent component carrier 116. However, a nearby component carrier 116 may not be adjacent. For example, a frequency band (e.g., 40 MHz) may separate a first component carrier 116 and a second component carrier 116 being used by the wireless communication device 102. In other words, nearby component carriers need not be in contiguous frequency bands. A nearby component carrier 116 may not even be the nearest component carrier 116 being used by the wireless communication device 102 from either direction.

Figure 6:
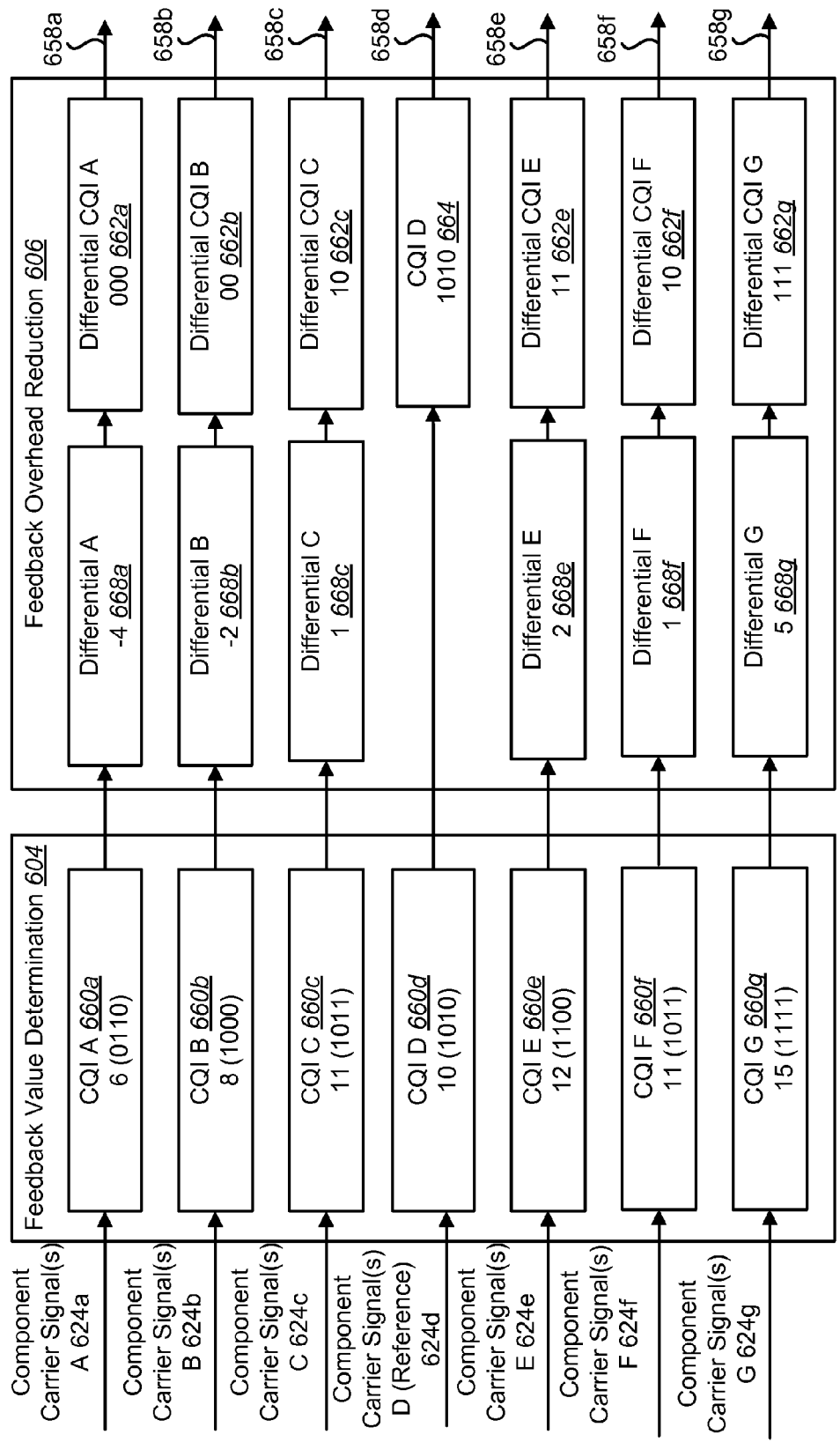
FIG. 6 is a block diagram illustrating a more specific example of reducing feedback overhead for multiple component carriers.

FIG. 6 is a block diagram illustrating a more specific example of reducing feedback overhead for multiple component carriers. In this example, CQIs for seven component carriers 116 are illustrated. The feedback value determination module 604 may use component carrier signals A through G 624a-g to determine CQI values A through G 660a-g. The feedback value determination module 604 determines CQI A 660a as 6 (0110 using a 4-bit sequence), CQI B 660b as 8 (1000), CQI C 660c as 11 (1011), CQI D 660d as 10 (1010), CQI E 660e as 12 (1100), CQI F 660f as 11 (1011) and CQI G 660g as 15 (1111).

The feedback overhead reduction module 606 uses the CQIs 660a-g to determine several differential values 668a-c, 668e-g. In the example illustrated, each of the differential values 668a-c, 668e-g are determined with respect to CQI D 660d corresponding to the reference component carrier 116. Thus, differential A 668a is −4, differential B 668b is −2, differential C 668c is 1, differential E 668e is 2, differential F 668f is 1 and differential G 668g is 5.

As mentioned above, differential feedback values corresponding to component carriers 116 that are closer to the component carrier 116 corresponding to the feedback value used to determine the differential feedback value may be expressed using fewer bits that those that are farther away, which allows greater variation in differential feedback values for more distant component carriers 116. For the example illustrated in FIG. 6, assume that the two-bit sequences {00, 01, 10, 11} correspond to differential values {−2, 0, 1, 2} and that the three-bit sequences {000, 001, 010, 011, 100, 101, 110, 111} correspond to differential values {−4, −3, −2, −1, 0, 1, 2, 3} or {≦−4, −3, −2, −1, 0, 1, 2, ≧3}. For example, the boundary values may be interpreted as the second differential feedback value being less than or equal to or greater than or equal to the sum of the reference or primary feedback value and the boundary value.

In the example illustrated in FIG. 6, CQI D 660d corresponds to the reference component carrier 116. For example, CQI D 660d may correspond to an anchor component carrier 116. Thus, CQI D 664 is represented using a full bit representation 1010. The differential CQIs 662b-c, 662e-f that are nearest to CQI D 664 are represented using only two bits. That is, differential CQI B 662b is represented as 00, differential CQI C 662c is represented as 10, differential CQI E 662e is represented as 11 and differential CQI F 662f is represented as 10. The differential CQIs 662a, 662g corresponding to component carriers 116 that are farther from the reference component carrier 116 are represented using more (e.g., three) bits. For example, differential CQI A 662a is represented as 000 and differential CQI G 662g is represented as 111. CQI D 664 and the differential CQIs 662a-c, 662e-g may be sent to the base station 110 as feedback messages/reduced feedback messages 658a-g.

As noted above, more bit combinations may be used for or mapped to better feedback values than poorer feedback values. As illustrated in FIG. 6, for example, the differential feedback values {−2, 0, 1, 2} correspond to the two-bit combinations {00, 01, 10, 11}. In this mapping, more bit combinations (e.g., {10, 11}) are used for better CQI values (e.g., {1, 2}) than are used for poorer CQI values (e.g., {00} for {−2}). Using such a mapping may be beneficial, since in some configurations, better CQI values are more likely to occur than poorer CQI values. However, such a mapping need not be necessarily used, as illustrated by the three-bit mapping.

Figure 7:
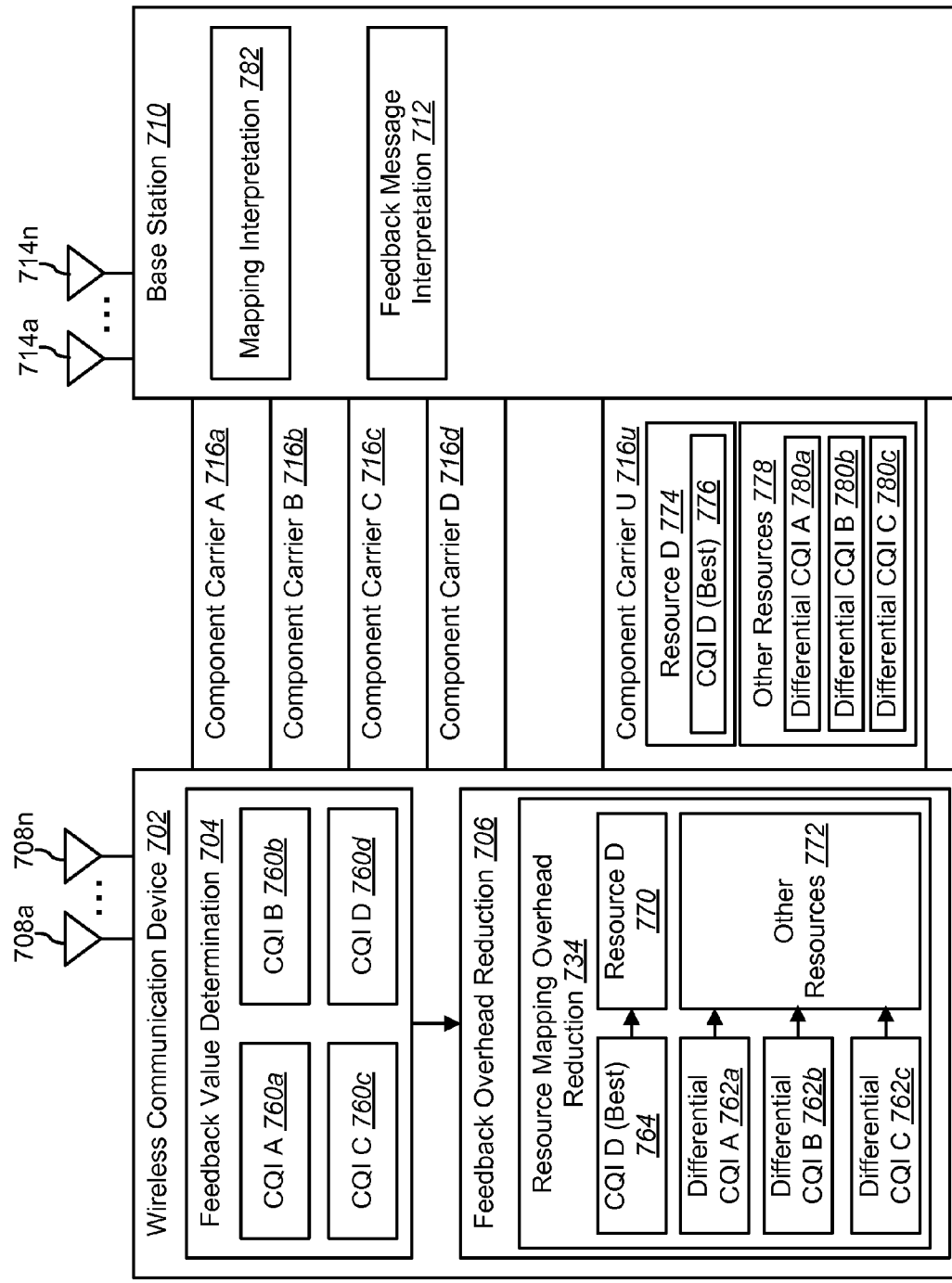
FIG. 7 is a block diagram illustrating another example of reducing feedback overhead for multiple component carriers.

FIG. 7 is a block diagram illustrating another example of reducing feedback overhead for multiple component carriers. In particular, FIG. 7 illustrates the use of resource mapping overhead reduction. A wireless communication device 702 may communicate with a base station 710 using one or more antennas 708a-n. Similarly, the base station 710 may communicate with the wireless communication device 702 using one or more antennas 714a-n. The wireless communication device 702 and the base station 710 may use several component carriers 716a-d, 716u to communicate.

The wireless communication device 702 may include a feedback value determination module 704 and a feedback overhead reduction module 706. In the example illustrated in FIG. 7, the feedback value determination module 704 determines CQI A 760a for component carrier A 716a, CQI B 760b for component carrier B 716b, CQI C 760c for component carrier C 716c and CQI D 760d for component carrier D 716d.

The feedback overhead reduction module 706 uses a resource mapping overhead reduction module 734 to reduce overhead in feedback value reporting. For example, assume that the feedback overhead reduction module 706 determines CQI D 760d to be the best CQI, and hence the reference CQI D 764. The feedback overhead reduction module 706 further determines differential CQI A 762a, differential CQI B 762b and differential CQI C 762c with respect to the best CQI D 764. When the systems and methods disclosed herein are not used, the wireless communication device 702 may need to explicitly signal which component carrier corresponds to the best CQI in order for the base station 710 to correctly interpret the differential CQI values. However, according to the systems and methods disclosed herein, the resource mapping overhead reduction module 734 may use an implicit mapping function to indicate the component carrier 716 corresponding to the best CQI 764. For example, the resource mapping overhead reduction module 734 maps the best CQI D 764 to resource D 770 in order to indicate to the base station 710 that the best CQI D 764 corresponds to component carrier D 716d. The differential CQIs 762a-c may be mapped to other resources 772.

As used herein, a "resource" may denote a communication resource. For example, a resource may be a particular window of time (e.g., time slot(s)), communication frequency (e.g., frequency band), spatial channel and/or code. For example, assume that component carrier U 716u is used for an uplink control channel. Component carrier U 716u includes resource D 774 and other resources 778. Resource D 774 may be a designated time window (e.g., time frame, slot, etc.) at a designated frequency and/or on a designated spatial channel. Additionally or alternatively, resource D 774 may be indicated by a particular code.

The wireless communication device 702 may transmit the best CQI D 776 using resource D 774 on component carrier U 716u. The wireless communication device 102 may transmit the differential CQIs 780a-c using other resources 778. The base station 710 may receive the CQIs 776, 780a-c. The base station 710 may include a mapping interpretation 782. The mapping interpretation 782 may indicate designated resources (e.g., resource D 774) corresponding to particular component carriers 716. In the example illustrated in FIG. 7, the mapping interpretation 782 indicates that a CQI message sent using resource D 774 corresponds to component carrier D 716d. Thus, when the base station 710 receives the best CQI D 776 on resource D 774, the best CQI D 776 is implicitly indicated as corresponding to component carrier D 716d.

The base station 710 may also include a feedback message interpretation module 712. The feedback message interpretation 712 may indicate the scheme being used to report feedback values. In the example illustrated in FIG. 7, the feedback message interpretation module 712 indicates that a single best CQI and one or more differential CQIs with respect to the best CQI will be used. Thus, the base station 710 uses the mapping interpretation module 782 and the feedback message interpretation module 712 to determine that the best CQI D 776 corresponds to component carrier D 716d and to determine CQI values corresponding to the remaining component carriers A-C 716a-c by using the differential CQIs A-C 780a-c with respect to the best CQI D 776.

More specifically, reporting the CQI of the best component carrier may entail also reporting the index of the component carrier corresponding to the best CQI. However, one way of avoiding the reporting overhead for the best component carrier is to use resource selection to indicate the best component carrier. For example, assume that a CQI could be transmitted on 'M' resources by the wireless communication device 102 or UE (where M≧the number of component carriers for which the CQI is reported). For the best CQI, the wireless communication device 102 or UE chooses to transmit the CQI on the resource corresponding to the component carrier to which it belongs (e.g., if the best CQI corresponds to component carrier 2, the UE reports the best CQI on resource 2).

In general, the resource mapping overhead reduction module 734 (e.g., an implicit mapping function) may be used to map feedback messages to certain resources in order to indicate certain properties of the feedback messages. Examples of feedback message properties include best feedback value designation, reference component carrier designation, component carrier designation (e.g., a feedback message on a particular resource corresponds to a particular component carrier), ordering (e.g., best to worst feedback value, ordering for differential feedback value interpretation, ordering in frequency, etc.) and grouping, etc.

In another configuration, the resource mapping overhead reduction module 734 may use a grouping (e.g., an implicit grouping) determined by the base station 710. For example, the base station 710 may send control information for a certain group of component carriers 716 (e.g., on a PDCCH).

The resource mapping overhead reduction module 734 may determine and send, for example, a single feedback message for that group of component carriers 716. For example, assume that the base station 710 sends control information for component carriers A and B 716a-b jointly. The feedback overhead reduction module 706 may determine a single CQI value and represent it as a single feedback message for the group, including component carriers A and B 716a-b. The wireless communication device 702 may send the single feedback message to the base station 710, implicitly indicating that component carriers A and B 716a-b have been grouped (and that the single feedback message applies to both component carriers A and B 716a-b). The base station 710 recognizes this implicit grouping (since it 710 transmitted control information for that group) and uses the received single feedback message for both component carriers A and B 716a-b.

Figure 8:
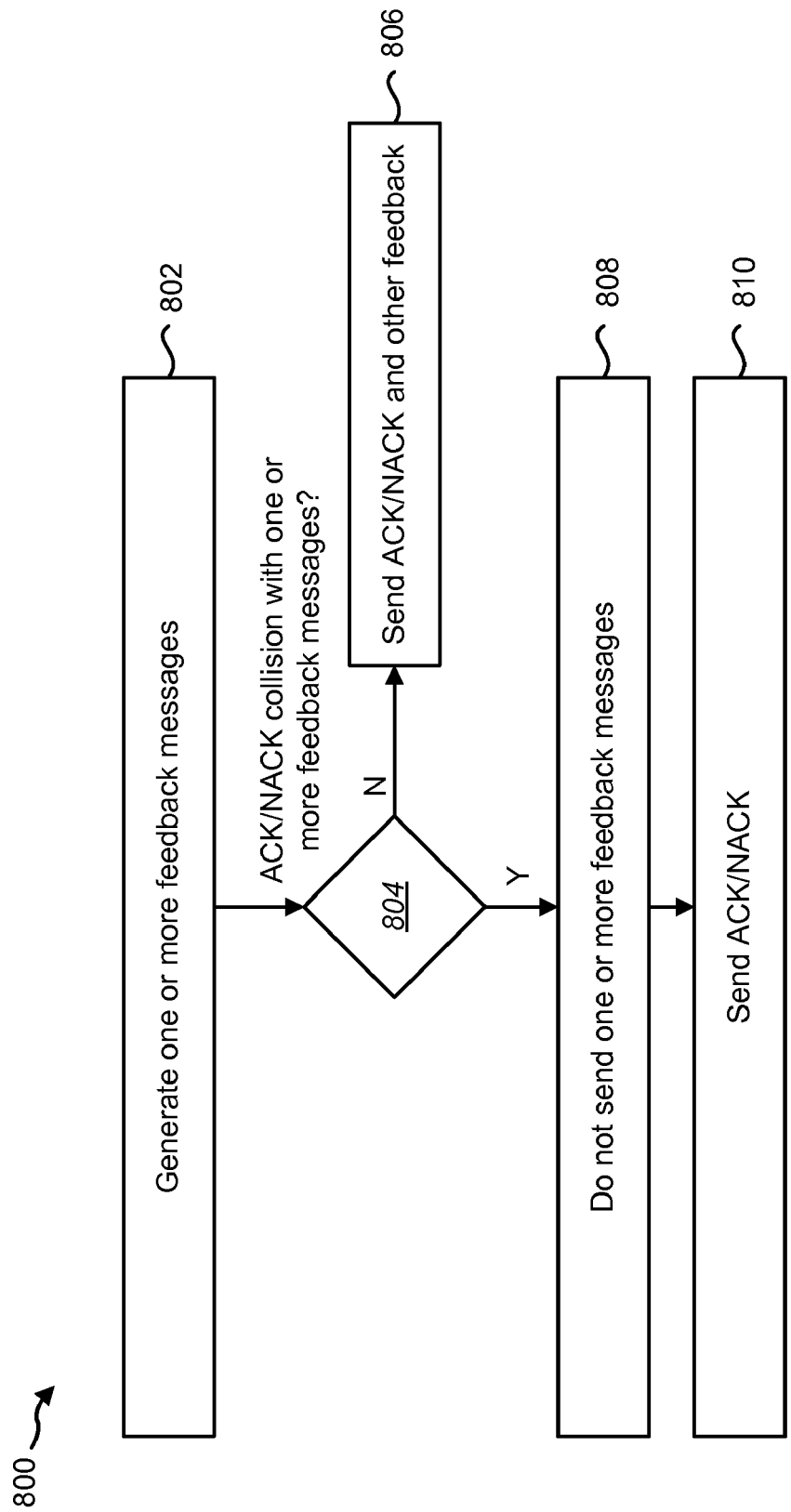
FIG. 8 is a flow diagram illustrating another configuration of a method for reducing feedback overhead for multiple component carriers.

FIG. 8 is a flow diagram illustrating another configuration of a method 800 for reducing feedback overhead for multiple component carriers. A wireless communication device 102 may generate 802 one or more feedback messages 122 (e.g., CQIs, PMIs, RIs, etc.). For example, the wireless communication device 102 may determine feedback values for one or more component carriers and may generate 802 one or more feedback messages and/or reduced overhead feedback messages corresponding to the one or more component carriers.

The wireless communication device 102 may determine 804 whether there is an ACK/NACK collision with the one or more feedback messages. An ACK/NACK collision occurs when both ACK/NACK message(s) and feedback message(s) cannot be sent within the same resource. For example, a particular time frame or time slot may not have enough capacity (e.g., in number of bits) to send both the ACK/NACK message(s) and the feedback message(s). If an ACK/NACK collision does not occur, the wireless communication device 102 may send both 806 the ACK/NACK message(s) and the one or more feedback message(s). For example, the ACK/NACK message(s) and the one or more feedback message(s) may be multiplexed.

If an ACK/NACK collision occurs with the one or more feedback message(s), the wireless communication device 102 may not send 808 the one or more feedback messages. The wireless communication device 102 may send 810 the ACK/NACK message(s). For example, the wireless communication device 102 may send 810 only the ACK/NACK message(s) and may either send the one or more feedback messages later or may never send the current feedback messages.

Figure 9:
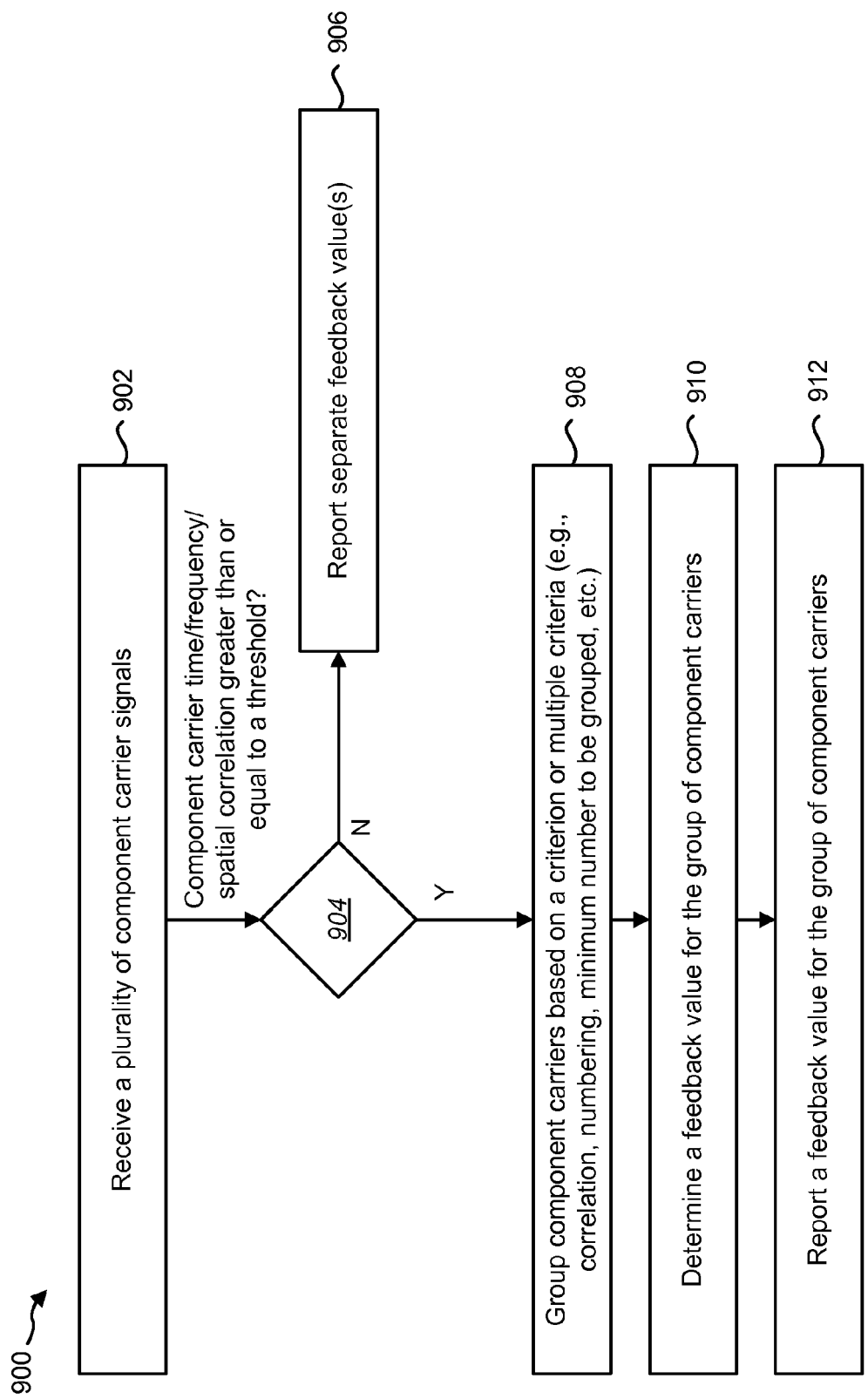
FIG. 9 is a flow diagram illustrating another configuration of a method for reducing overhead feedback for multiple component carriers.

FIG. 9 is a flow diagram illustrating another configuration of a method 900 for reducing overhead feedback for multiple component carriers 116. A wireless communication device 102 may receive 902 a plurality of component carrier signals. More specifically, the wireless communication device 102 may receive data or signals from a base station 110 on two or more component carriers 116. The wireless communication device 102 may use the data or signals to make certain measurements (e.g., SNR, BER, signal strength, phase error, etc.).

The wireless communication device may determine 904 if a time, frequency and/or spatial correlation between the two or more component carriers 116 is greater than or equal to a threshold. For example, the wireless communication device 102 may determine one or more correlations in time, frequency and/or space between component carriers 116. Higher correlations between component carriers 116 may indicate that feedback values for the component carriers 116 are likely to be close to or the same as each other.

If the wireless communication device 102 determines 904 that the time, frequency and/or spatial correlation between component carriers 116 is not greater than or equal to a threshold, then the wireless communication device 102 may report 906 separate feedback values. For example, the wireless communication device 102 may generate and send a feedback message 122 (or reduced overhead feedback message) for each component carrier to the base station 110.

If the wireless communication device 102 determines that the time, frequency and/or spatial correlation is greater than or equal to the threshold, the wireless communication device 102 may group 908 component carriers 116 based on a criterion or multiple criteria. For example, the wireless communication device 102 may group 908 component carriers based on correlation (e.g., time, frequency and/or spatial). In another configuration, the wireless communication device 102 may group 908 component carriers based on another criterion. For example, the component carriers may be grouped based on a predetermined number of component carriers, or other scheme (e.g., based on component carrier index numbers, etc.). The wireless communication device 102 may determine 910 a feedback value for the group of component carriers 116. For example, the wireless communication device 102 may select one feedback value corresponding to one of the component carriers 116 to represent the group of the component carriers 116. Alternatively, the wireless communication device 102 may determine a feedback value based on the feedback values corresponding to the group of component carriers 116. For example, the wireless communication device 102 may determine an average of the feedback values (e.g., rounded to the nearest feedback value), using it to represent all of the component carriers 116 in the group.

The wireless communication device 102 may report 912 a feedback value for the group of component carriers 116. For example, the wireless communication device 102 may format the feedback value for the group of component carriers 116 into a reduced overhead feedback message and send it to the base station 110. It should be noted that the reduced overhead feedback message may use the full number of bits used to represent a feedback value, but may be considered a reduced overhead feedback message since it represents multiple feedback values corresponding to multiple component carriers 116.

Figure 10:
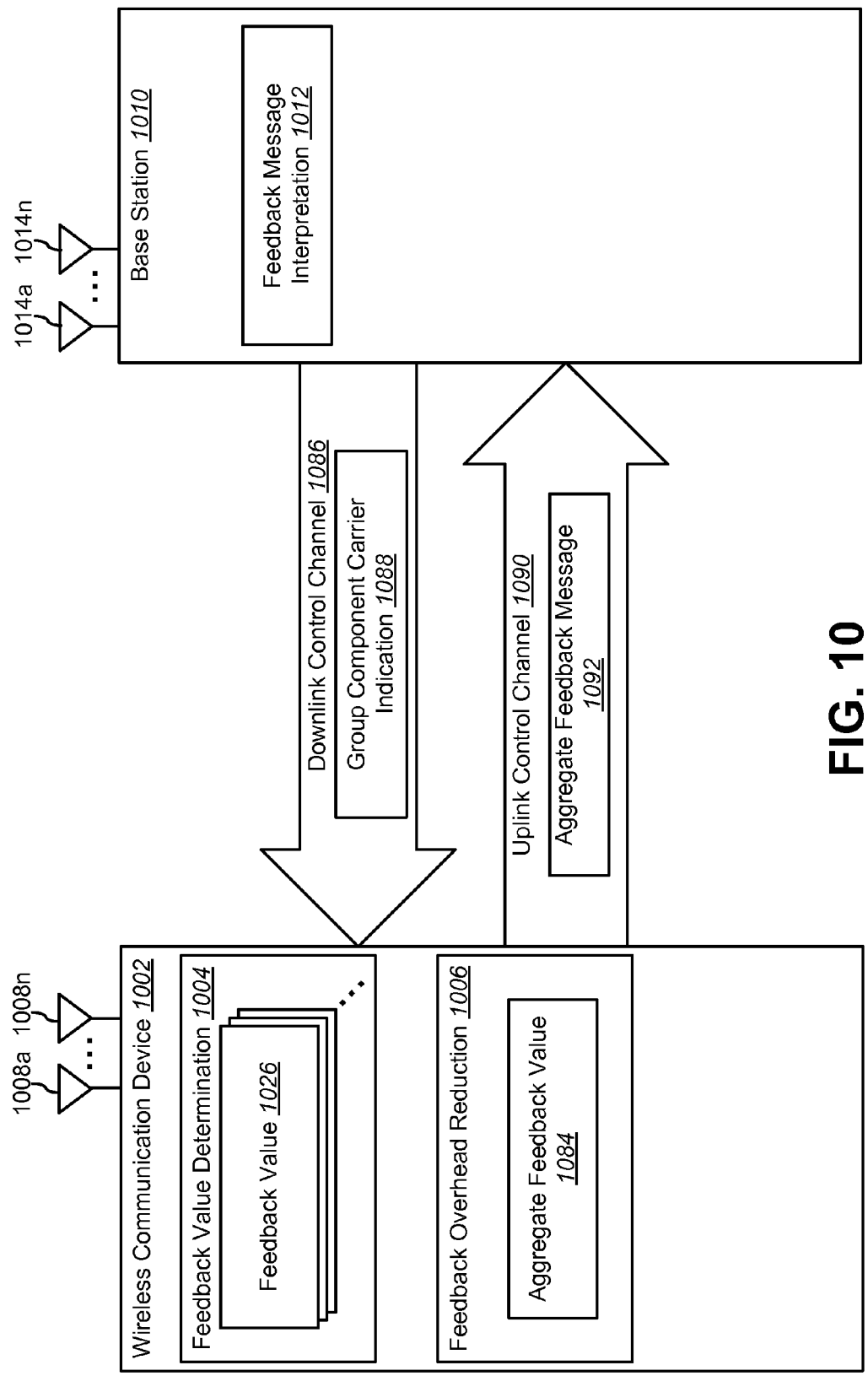
FIG. 10 is a block diagram illustrating another example of reducing feedback overhead for multiple component carriers.

FIG. 10 is a block diagram illustrating another example of reducing feedback overhead for multiple component carriers. In this example, a wireless communication device 1002 uses one or more antennas 1008a-n to communicate with a base station 1010. The base station 1010 also uses one or more antennas 1014a-n to communicate with the wireless communication device 1002.

In this example, the base station 1010 uses a downlink control channel 1086 (e.g., a Physical Downlink Control Channel (PDCCH)) to send control information (e.g., scheduling, power control, etc.) to the wireless communication device 1002. The base station 1010 may send control information corresponding to multiple component carriers 116. In other words, the control information may be sent for a group of component carriers 116. The grouping of component carriers 116 may be used as a group component carrier indication 1088. For example, the wireless communication device 1002 may interpret the control information corresponding to a group of component carriers as an implicit group component carrier indication 1088.

The feedback value determination module 1004 may determine feedback values 1026. In particular, the feedback value determination module 1004 may determine feedback values 1026 corresponding to the group of component carriers indicated by the group component carrier indication 1088. The feedback overhead reduction module 1006 may determine a single aggregate feedback value 1084 for the group of component carriers 116 (implicitly indicated by the group component carrier indication). The aggregate feedback value 1084 may be, for example, a single selected feedback value (e.g., CQI, PMI, RI, etc.) or a rounded average feedback value.

The feedback overhead reduction module 1006 may format the aggregate feedback value 1084 into an aggregate feedback message 1092. For example, the aggregate feedback message 1092 may be a reduced overhead feedback message. The aggregate feedback message 1092 may be sent to the base station 1010 using an uplink control channel 1090. The base station 1010 may use a feedback message interpretation module 1012 to interpret the aggregate feedback message 1092. For example, the feedback message interpretation module 1012 may obtain or store information about the group component carrier indication 1088. In other words, the feedback message interpretation module 1012 may obtain or store information about the control information that is sent on the downlink control channel 1086. In particular, the feedback message interpretation module may determine the group of component carriers that had corresponding control information jointly sent on the downlink control channel 1086. Thus, when the base station 1010 receives an aggregate feedback message 1092, it 1010 may use the aggregate feedback message for the group of component carriers (implicitly) indicated by the group component carrier indication 1088. In another configuration, the component carrier aggregation may be explicitly signaled (e.g., using Radio Resource Control (RRC) signaling).

Figure 11:
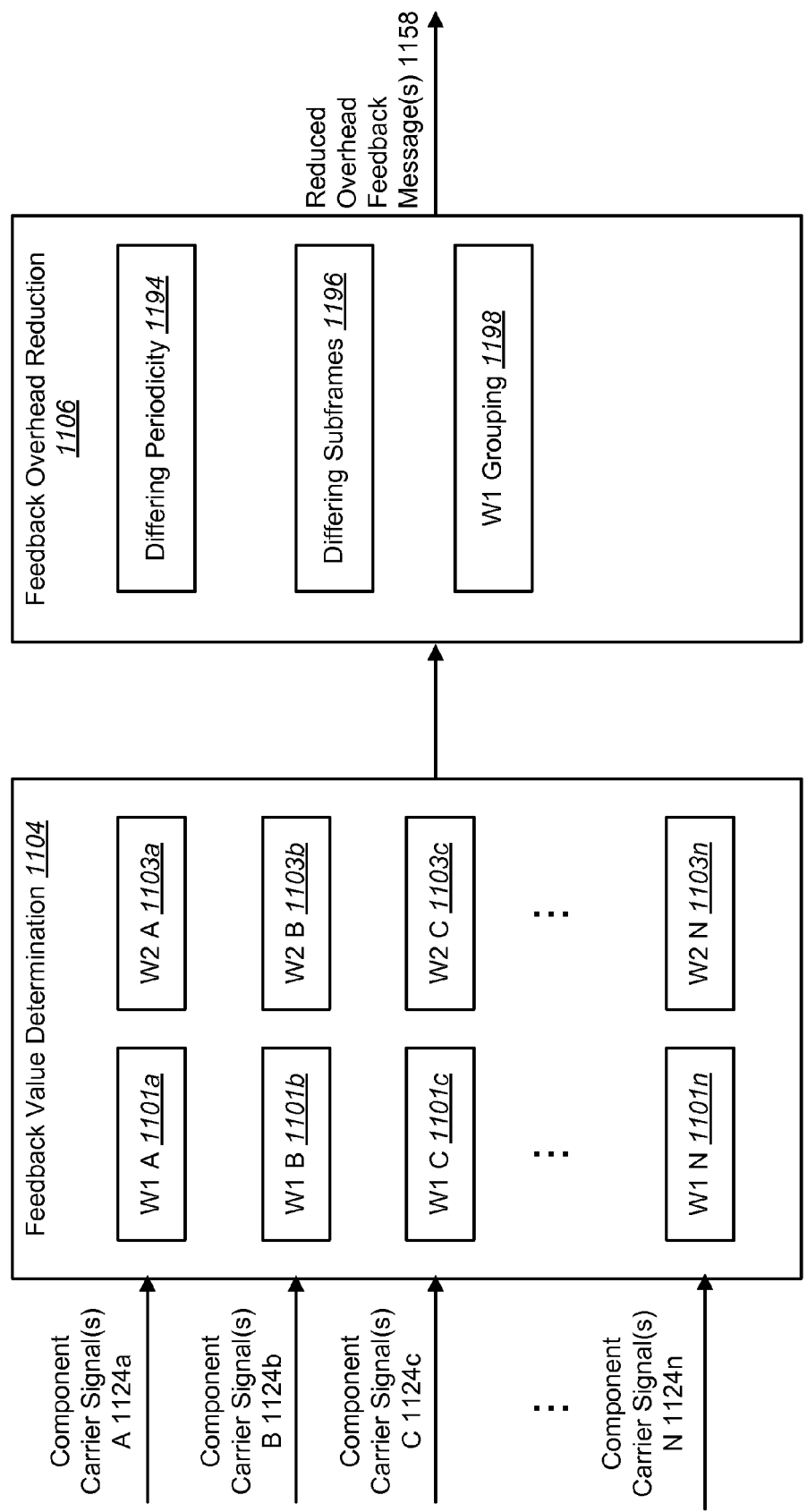
FIG. 11 is a block diagram illustrating another example of reducing feedback overhead for multiple component carriers.

FIG. 11 is a block diagram illustrating another example of reducing feedback overhead for multiple component carriers. The feedback value determination module 1104 may use component carrier signals 1124*a-n* to determine feedback values. In this example, feedback values corresponding to a precoding matrix indicator (PMI) are shown. For example, a precoding matrix may be determined based on two differing matrices, W1 1101 and W2 1103. W1 1101 may target wideband/long-term channel properties, while W2 1103 may target frequency-selective/short-term time channel properties. The feedback value determination module 1104 may determine a W1 matrix 1101*a-n* and a W2 matrix 1103*a-n* corresponding to each component carrier 116.

The feedback overhead reduction module 1106 may include a differing periodicity function 1194, a differing subframes function 1196 and a W1 grouping function 1198. This may be an example of long-term and short-term feedback. For example, a precoding matrix W for a subband is a function of two matrices W1 and W2. For instance, W1∈C1 and W2∈C2. The codebooks C1 and C2 are codebooks one and two, respectively. The first matrix W1 targets wideband/long-term channel properties, while the second matrix W2 targets frequency-selective/short-term time channel properties. The feedback corresponding to W1 and W2 may be configured to be sent in the same subframe or in different subframes 1196. For example, W1 and W2 may be reported with different periodicities 1194. Moreover, a joint W1 may be reported for multiple component carriers 116 or a group of component carriers 1198. Using one or more of these approaches may produce reduced overhead feedback message(s) 1158.

Figure 12:
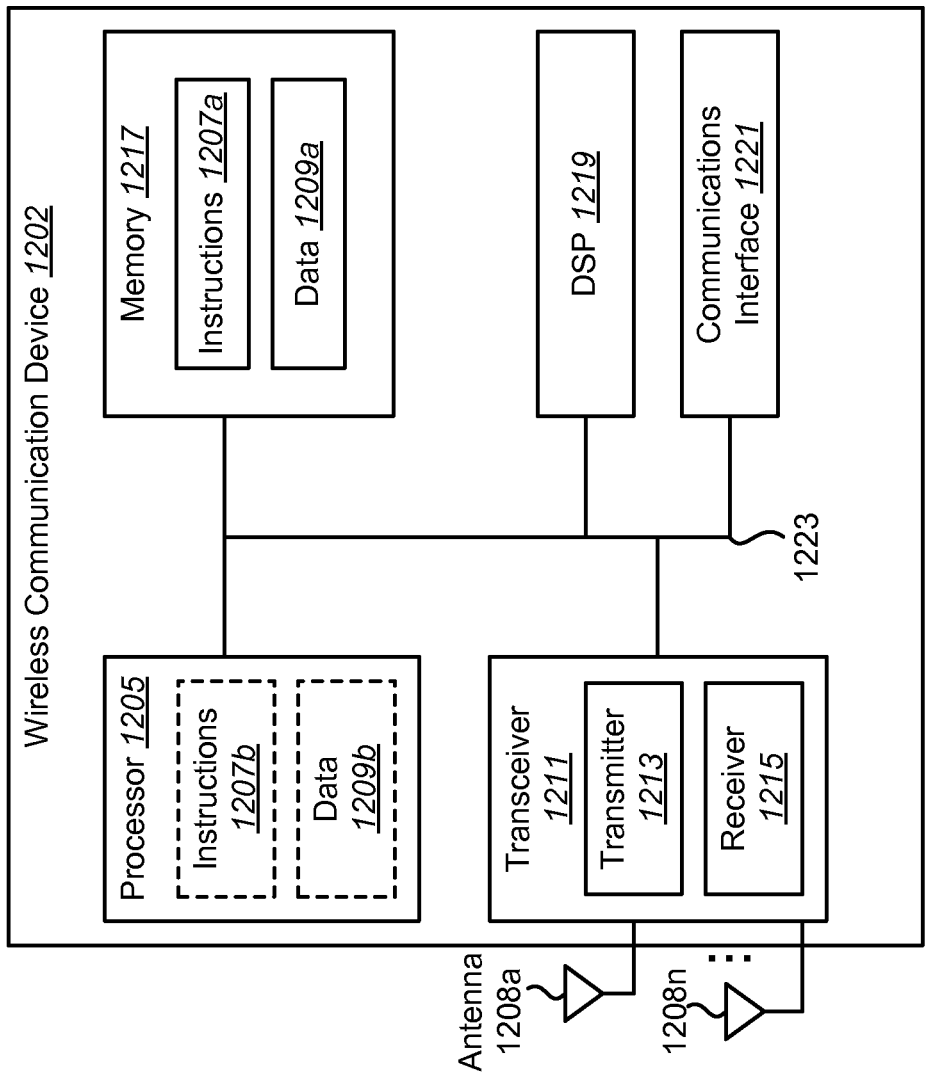
FIG. 12 illustrates various components that may be utilized in a wireless communication device.

FIG. 12 illustrates various components that may be utilized in a wireless communication device 1202. The wireless communication device 1202 may be utilized as the wireless communication devices 102, 702, 1002 illustrated previously. The wireless communication device 1202 includes a processor 1205 that controls operation of the wireless communication device 1202. The processor 1205 may also be referred to as a CPU. Memory 1217, which may include both read-only memory (ROM), random access memory (RAM) or any type of device that may store information, provides instructions 1207*a* and data 1209*a* to the processor 1205. A portion of the memory 1217 may also include non-volatile random access memory (NVRAM). Instructions 1207*b* and data 1209*b* may also reside in the processor 1205. Instructions 1207*b* loaded into the processor 1205 may also include instructions 1207*a* from memory 1217 that were loaded for execution by the processor 1205. The instructions 1207*b* may be executed by the processor 1205 to implement the systems and methods disclosed herein.

The wireless communication device 1202 may also include a housing that contains a transmitter 1213 and a receiver 1215 to allow transmission and reception of data. The transmitter 1213 and receiver 1215 may be combined into a transceiver 1211. One or more antenna 1208*a-n* are attached to the housing and electrically coupled to the transceiver 1211.

The various components of the wireless communication device 1202 are coupled together by a bus system 1223 which may include a power bus, a control signal bus, and a status signal bus, in addition to a data bus. However, for the sake of clarity, the various buses are illustrated in FIG. 12 as the bus system 1223. The wireless communication device 1202 may also include a digital signal processor (DSP) 1219 for use in processing signals. The wireless communication device 1202 may also include a communications interface 1221 that provides user access to the functions of the wireless communication device 1202. The wireless communication device 1202 illustrated in FIG. 12 is a functional block diagram rather than a listing of specific components.

Figure 13:
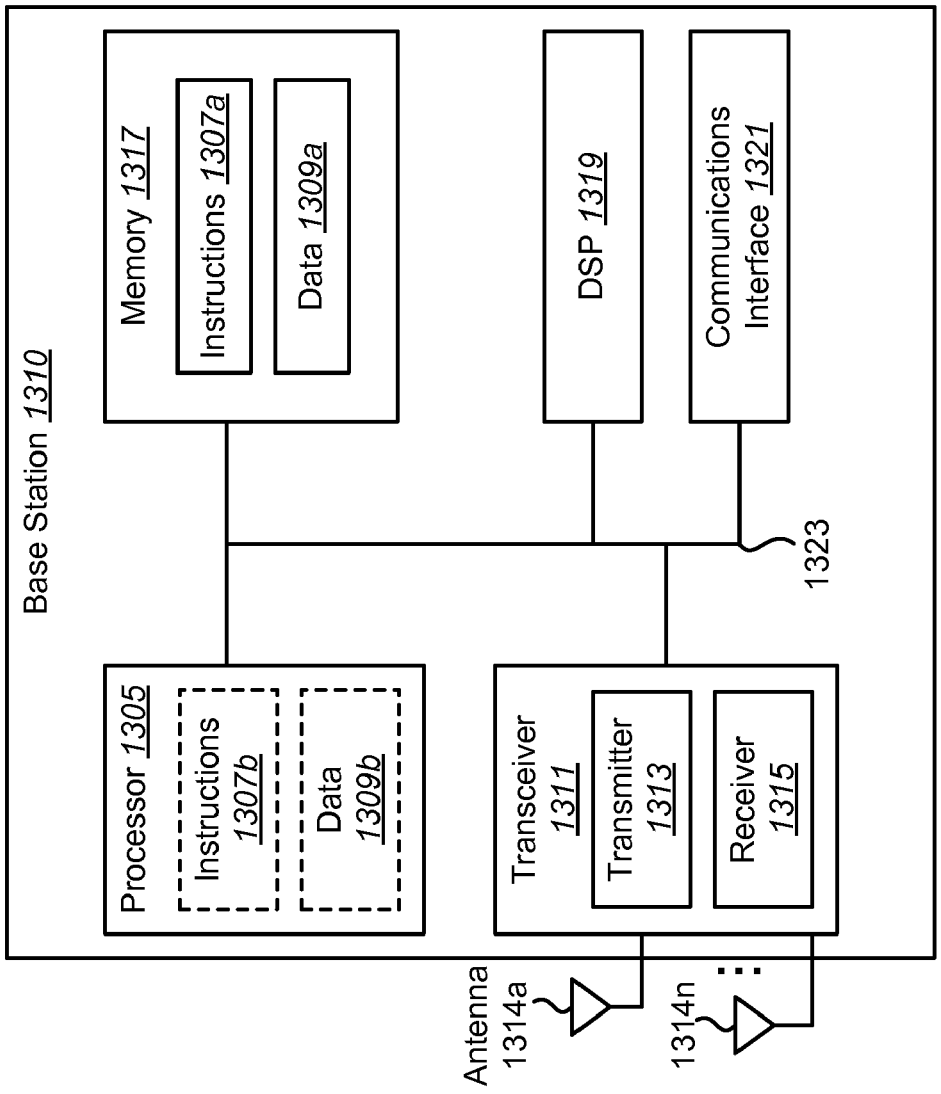
FIG. 13 illustrates various components that may be utilized in a base station.

FIG. 13 illustrates various components that may be utilized in a base station 1310. The base station 1310 may be utilized as the base stations 110, 710, 1010 illustrated previously. The base station 1310 may include components that are similar to the components discussed above in relation to the wireless communication device 1202, including a processor 1305, memory 1317 that provides instructions 1307*a* and data 1309*a* to the processor 1305, instructions 1307*b* and data 1309*b* that may reside in or be loaded into the processor 1305, a housing that contains a transmitter 1313 and a receiver 1315 (which may be combined into a transceiver 1311), one or more antennas 1314*a-n* electrically coupled to the transceiver 1311, a bus system 1323, a DSP 1319 for use in processing signals, a communications interface 1321 and so forth.

The term "computer-readable medium" or "processor-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Each of the methods disclosed herein comprises one or more steps or actions for achieving the described method. The method steps and/or actions may be interchanged with one another, combined into a single step or incorporated into other ancillary aspects of the communication system without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A wireless communication device configured for reducing feedback overhead for multiple component carriers, comprising:
   a processor;
   memory in electronic communication with the processor;
   instructions stored in the memory, the instructions being executable to:
      receive signals on a plurality of component carriers;
      determine at least one feedback value based on the signals;
      generate at least one reduced overhead feedback message for the plurality of component carriers based on the at least one feedback value, wherein the at least one reduced overhead feedback message is generated based on a difference between a first feedback value and a second feedback value, wherein the first feedback value corresponds to a reference component carrier, wherein the reference component carrier is one of a group consisting of an anchor component carrier and a primary component carrier; and
      send the at least one reduced overhead feedback message.

2. The wireless communication device of claim 1, wherein the first feedback value corresponds to a secondary component carrier and the second feedback value corresponds to an additional component carrier.

3. The wireless communication device of claim 1, wherein the at least one reduced overhead feedback message is mapped to a resource to implicitly indicate a component carrier corresponding to the reduced overhead feedback message.

4. The wireless communication device of claim 1, wherein the at least one reduced overhead feedback message comprises a different number of bits than another reduced overhead feedback message corresponding to another component carrier.

5. The wireless communication device of claim 1, wherein the at least one reduced overhead feedback message comprises a number of bits, wherein more bit combinations are used to represent better feedback values than are used to represent lower feedback values.

6. The wireless communication device of claim 1, wherein the at least one reduced overhead feedback message represents a feedback value for a group of component carriers that are grouped in downlink control channel signaling.

7. The wireless communication device of claim 1, wherein the at least one reduced overhead feedback message is sent for a plurality of selected component carriers.

8. The wireless communication device of claim 7, wherein the plurality of selected component carriers are correlated according to one of the group consisting of time, frequency and space.

9. The wireless communication device of claim 1, wherein the at least one reduced overhead feedback message is sent with greater than a minimum periodicity.

10. The wireless communication device of claim 1, wherein the at least one reduced overhead feedback message comprises two reduced overhead feedback messages comprising a first matrix and a second matrix used to determine a precoding matrix, wherein the first matrix and the second matrix are sent with different periodicities.

11. The wireless communication device of claim 1, wherein the at least one feedback value is one of the group consisting of a Channel Quality Indicator (CQI), a Precoding Matrix Indicator (PMI) and a Rank Indicator (RI).

12. The wireless communication device of claim 1, wherein the instructions are further executable to send the reduced overhead feedback message on a single uplink channel, wherein the reduced overhead feedback message is based on a combination of multiple feedback values.

13. A wireless communication device configured for reducing feedback overhead for multiple component carriers, comprising:
   a processor;
   memory in electronic communication with the processor;
   instructions stored in the memory, the instructions being executable to:
      receive signals on a plurality of component carriers;
      determine at least one feedback value based on the signals;
      generate at least one reduced overhead feedback message based on the at least one feedback value, wherein the at least one reduced overhead feedback message is generated based on a difference between a first feedback value and a second feedback value, wherein the first feedback value corresponds to a reference component carrier, wherein the reference component carrier is one of a group consisting of an anchor component carrier and a primary component carrier;
      determine whether the at least one reduced overhead feedback message collides with an Acknowledgement/Negative Acknowledgement (ACK/NACK) message;
      not send the at least one reduced overhead feedback message if the at least one reduced overhead feedback message collides with the ACK/NACK message; and
      send only the ACK/NACK message using a format that is typically used to send a feedback message and an ACK/NACK message.

14. A method for reducing feedback overhead for multiple component carriers, comprising:
   receiving signals on a plurality of component carriers;
   determining, on a wireless communication device, at least one feedback value based on the signals;
   generating, on the wireless communication device, at least one reduced overhead feedback message for the plurality of component carriers based on the at least one feedback value, wherein the at least one reduced overhead feedback message is generated based on a difference between a first feedback value and a second feedback value, wherein the first feedback value corresponds to a reference component carrier, wherein the reference component carrier is one of a group consisting of an anchor component carrier and a primary component carrier; and
   sending the at least one reduced overhead feedback message.

15. The method of claim 14, wherein the first feedback value corresponds to a secondary component carrier and the second feedback value corresponds to an additional component carrier.

16. The method of claim 14, wherein the at least one reduced overhead feedback message is mapped to a resource to implicitly indicate a component carrier corresponding to the reduced overhead feedback message.

17. The method of claim 14, wherein the at least one reduced overhead feedback message comprises a different number of bits than another reduced overhead feedback message corresponding to another component carrier.

18. The method of claim 14, wherein the at least one reduced overhead feedback message comprises a number of bits, wherein more bit combinations are used to represent better feedback values than are used to represent lower feedback values.

19. The method of claim 14, wherein the at least one reduced overhead feedback message represents a feedback value for a group of component carriers that are grouped in downlink control channel signaling.

20. The method of claim 14, wherein the at least one reduced overhead feedback message is sent for a plurality of selected component carriers.

21. The method of claim 20, wherein the plurality of selected component carriers are correlated according to one of the group consisting of time, frequency and space.

22. The method of claim 14, wherein the at least one reduced overhead feedback message is sent with greater than a minimum periodicity.

23. The method of claim 14, wherein the at least one reduced overhead feedback message comprises two reduced overhead feedback messages comprising a first matrix and a second matrix used to determine a precoding matrix, wherein the first matrix and the second matrix are sent with different periodicities.

24. The method of claim 14, wherein the at least one feedback value is one of the group consisting of a Channel Quality Indicator (CQI), a Precoding Matrix Indicator (PMI) and a Rank Indicator (RI).

25. The method of claim 14, wherein sending the reduced overhead feedback message further comprises sending the reduced overhead feedback message on a single uplink channel, wherein the reduced overhead feedback message is based on a combination of multiple feedback values.

26. A method configured for reducing feedback overhead for multiple component carriers, comprising:
  receiving signals on a plurality of component carriers;
  determining at least one feedback value based on the signals;
  generating, on a wireless communication device, at least one reduced overhead feedback message based on the at least one feedback value, wherein the at least one reduced overhead feedback message is generated based on a difference between a first feedback value and a second feedback value, wherein the first feedback value corresponds to a reference component carrier, wherein the reference component carrier is one of a group consisting of an anchor component carrier and a primary component carrier;
  determining whether the at least one reduced overhead feedback message collides with an Acknowledgement/Negative Acknowledgement (ACK/NACK) message;
  not sending the at least one reduced overhead feedback message if the at least one reduced overhead feedback message collides with the ACK/NACK message; and
  sending, from the wireless communication device, only the ACK/NACK message using a format that is typically used to send a feedback message and an ACK/NACK message.

* * * * *